US012162666B2

(12) United States Patent
Schellinger et al.

(10) Patent No.: US 12,162,666 B2
(45) Date of Patent: Dec. 10, 2024

(54) CLOSURE FOR FLUID-TIGHT SEALING OF A VESSEL FILLED WITH A SUBSTANCE, CONTAINER WITH A VESSEL AND A CLOSURE AS WELL AS METHOD FOR FILLING A CONTAINER WITH A SUBSTANCE

(71) Applicants: Benedikt Schellinger, Sauldorf (DE); Simon Storz, Rietheim-Weilheim (DE)

(72) Inventors: Benedikt Schellinger, Sauldorf (DE); Simon Storz, Rietheim-Weilheim (DE)

( * ) Notice: Subject to any disclaimer, the term of this patent is extended or adjusted under 35 U.S.C. 154(b) by 202 days.

(21) Appl. No.: 17/528,013

(22) Filed: Nov. 16, 2021

(65) Prior Publication Data
US 2022/0073251 A1 Mar. 10, 2022

Related U.S. Application Data

(63) Continuation-in-part of application No. PCT/EP2020/063709, filed on May 15, 2020.

(30) Foreign Application Priority Data

May 17, 2019 (DE) ..................... 10 2019 113 136.7
Mar. 3, 2020 (DE) ..................... 10 2020 202 731.5
(Continued)

(51) Int. Cl.
*B65D 79/00* (2006.01)
*B65B 55/12* (2006.01)
(Continued)

(52) U.S. Cl.
CPC .......... *B65D 79/0087* (2020.05); *B65B 55/12* (2013.01); *B65D 41/325* (2013.01);
(Continued)

(58) Field of Classification Search
CPC .............. B65D 79/0087; B65D 41/325; B65D 41/3404; B65D 81/2053; B65D 2401/20; B65B 55/12
(Continued)

(56) References Cited

U.S. PATENT DOCUMENTS 2,034,739 A 3/1936 Bodor

FOREIGN PATENT DOCUMENTS

CN 108137201 A * 6/2018 ......... B65D 39/0023
DE 201 14 897 U1 1/2002
(Continued)

OTHER PUBLICATIONS

International Search Report mailed Aug. 31, 2020, issued to corresponding International Application No. PCT/EP2020/063709.

*Primary Examiner* — Jacob A Smith
(74) *Attorney, Agent, or Firm* — Stein IP, LLC

(57) ABSTRACT

The present invention relates in particular to a closure (3) for the fluid-tight closing of a vessel (2) filled with a substance (5), wherein the closure (3) is provided with a fluid-tight pressure-transmission element (9) and wherein the closure (3) is provided with a base body (8) to which the pressure-transmission element (9) can be attached in a fluid-tight manner, wherein the pressure-transmission element (9) is deflectable by pressurisation without incurring damage, for biological inactivation of microorganisms present in the substance (5), wherein the closure is configured in such a way that the pressure-transmission element (9), when the vessel (2) is closed with the closure (3), is held (clamped between the vessel (2) and the base body). The invention also relates to a corresponding container (1) and a corresponding method.

15 Claims, 11 Drawing Sheets

(30) Foreign Application Priority Data

Figure 1:
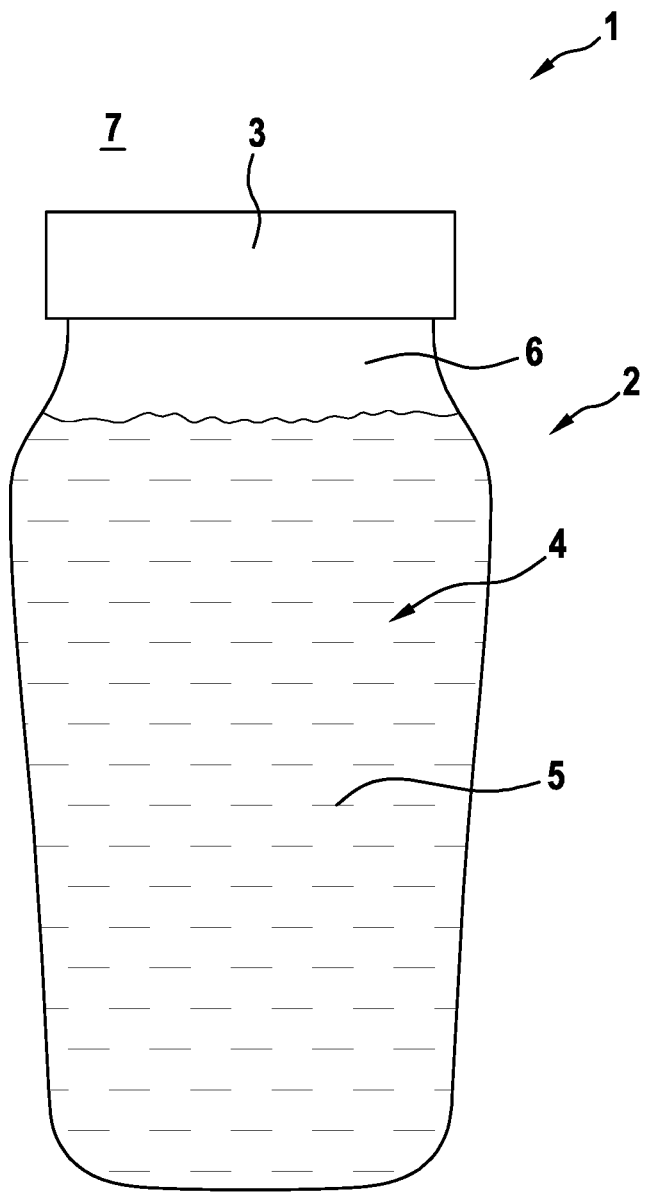

Nov. 16, 2020 (EP) .................................... 20207880
May 3, 2021 (WO) ................ PCT/EP2021/061581

(51) Int. Cl.
*B65D 41/32* (2006.01)
*B65D 41/34* (2006.01)
*B65D 81/20* (2006.01)

(52) U.S. Cl.
CPC ..... *B65D 41/3404* (2013.01); *B65D 81/2053* (2013.01); *B65D 2401/20* (2020.05)

(58) Field of Classification Search
USPC .......................................................... 53/428
See application file for complete search history.

(56) References Cited

FOREIGN PATENT DOCUMENTS

| | | |
|---|---|---|
| DE | 10 2005 013 902 B2 | 4/2006 |
| DE | 10 2014 102 971 A1 | 9/2014 |
| DE | 10 2014 223 282 A1 | 5/2016 |
| DE | 102016212598 B3 * | 11/2017 ............. A23L 3/015 |
| EP | 2 880 999 A1 | 6/2015 |
| FR | 2 752 224 A1 | 2/1998 |
| GB | 2 446 464 A | 8/2008 |
| WO | WO-9005681 A1 * | 11/1989 ............. B65D 41/34 |
| WO | WO 97/35779 A1 | 10/1997 |
| WO | WO 2014/135552 A1 | 9/2014 |

* cited by examiner

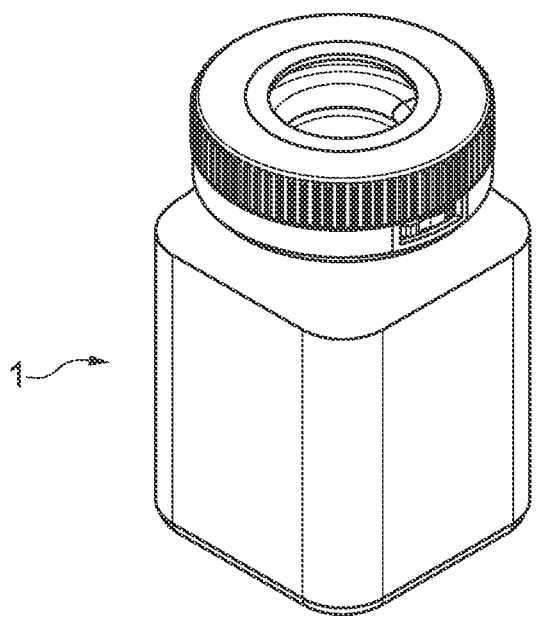
Fig. 6a
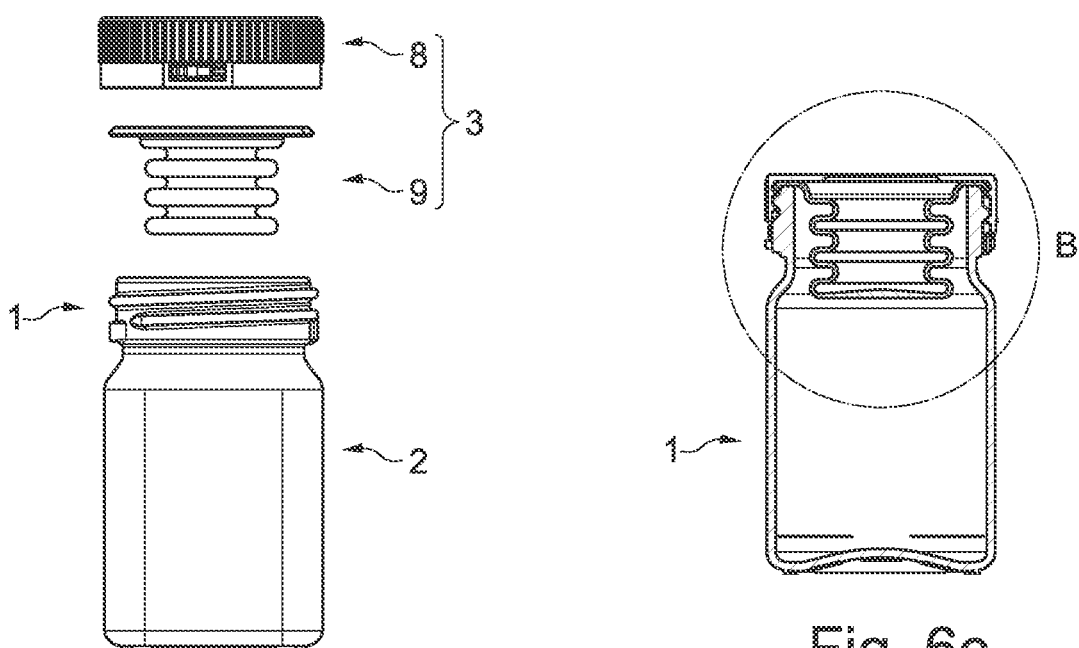
Fig. 6b
Fig. 6c

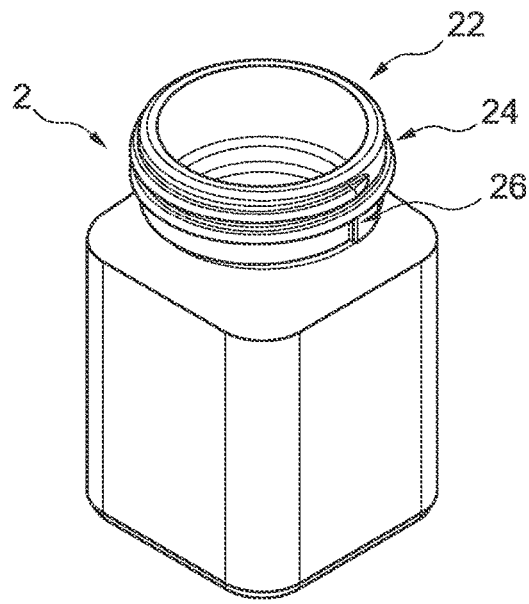
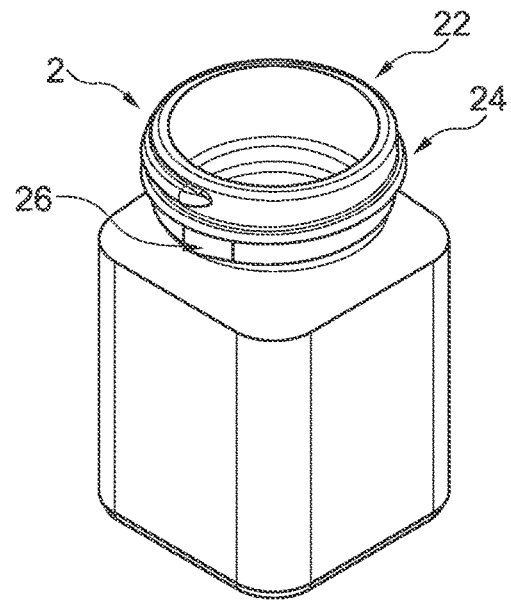
Fig. 7a                Fig. 7b
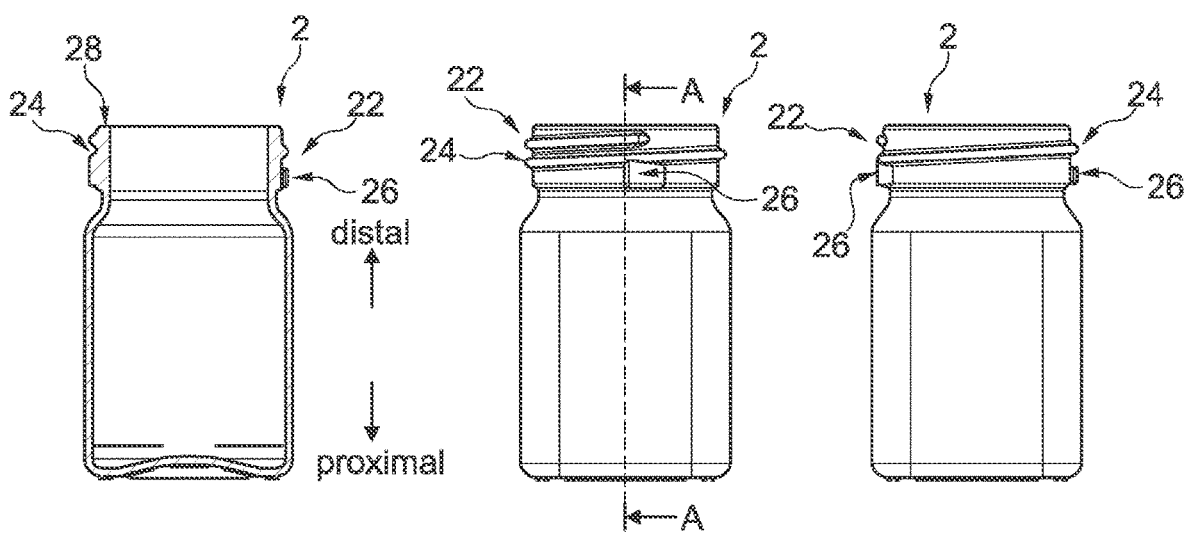
Fig. 7d          Fig. 7c          Fig. 7e

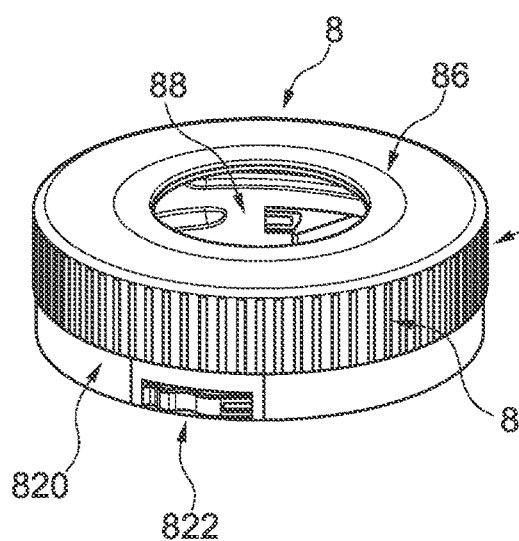
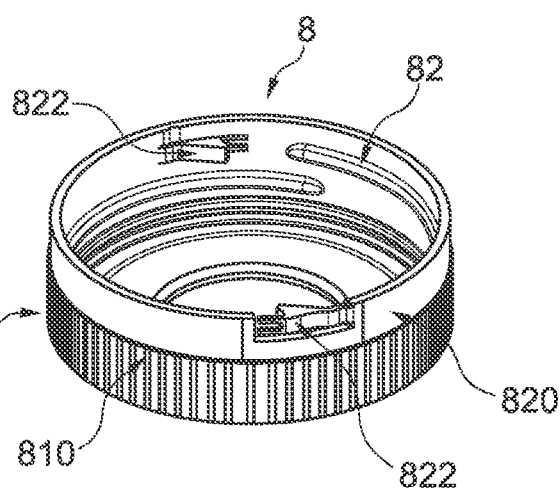
Fig. 8a    Fig. 8b
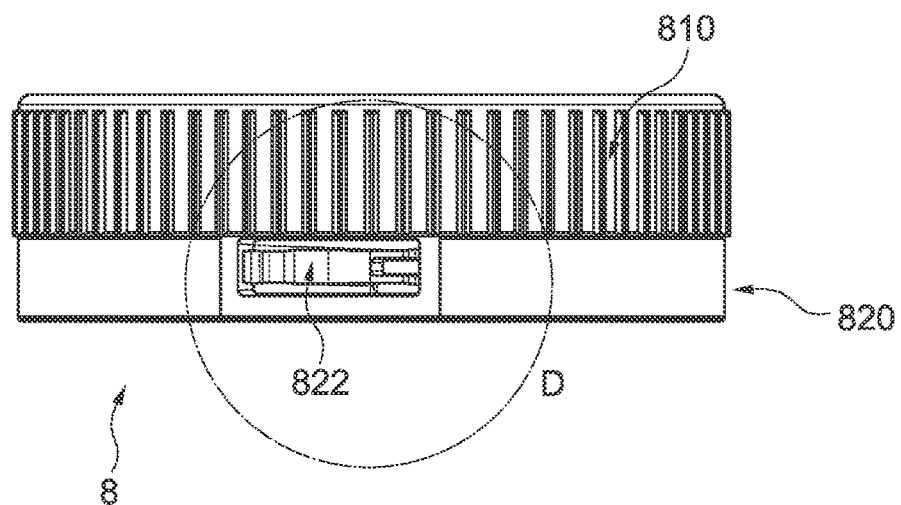
Fig. 8c
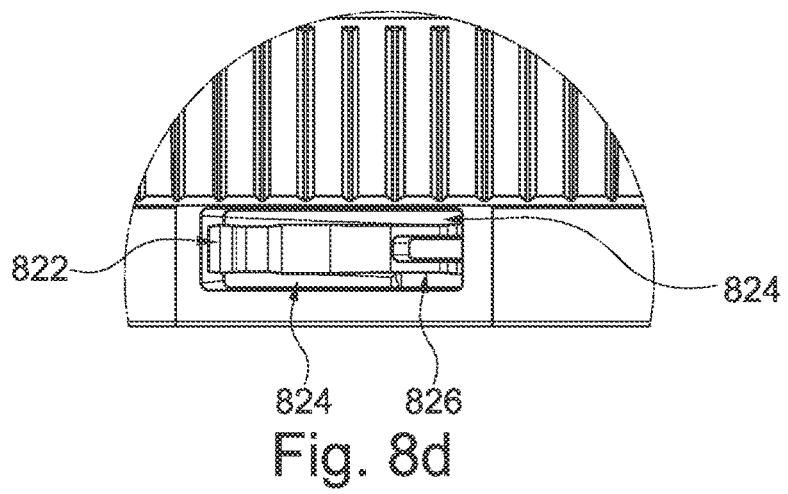
Fig. 8d

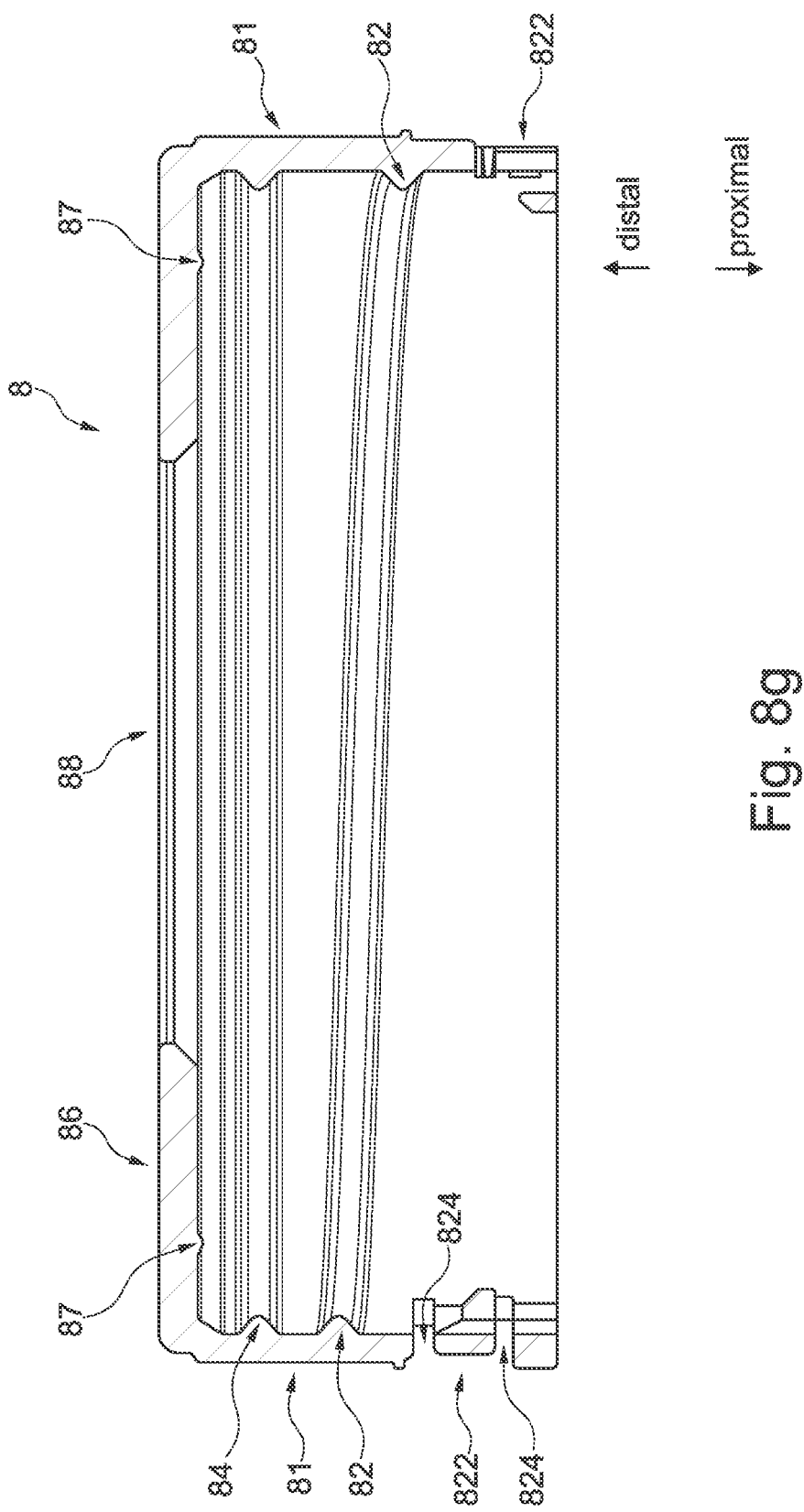

CLOSURE FOR FLUID-TIGHT SEALING OF A VESSEL FILLED WITH A SUBSTANCE, CONTAINER WITH A VESSEL AND A CLOSURE AS WELL AS METHOD FOR FILLING A CONTAINER WITH A SUBSTANCE

CROSS-REFERENCE TO RELATED APPLICATIONS

This application is a bypass continuation-in-part of International Application No. PCT/EP2020/063709, filed May 15, 2020, which claims the benefit of German Application No. 10 2019 113 136.7, filed May 17, 2019 and German Application No. 10 2020 202 731.5, filed Mar. 3, 2020, in the European Patent Office. This application also claims the benefit of European Application No. 20207880.4, filed Nov. 16, 2020 and International Application No. PCT/EP2021/061581, filed May 3, 2021, in the European Patent Office. All disclosures of the documents named above are incorporated herein by reference.

The invention relates, inter alia, to a closure (and parts thereof) for fluid-tight sealing of a vessel filled with a substance, to a corresponding vessel, as well as to a container with a vessel and with a closure fluid-tightly closing the vessel, and to a method for filling a container with a substance.

From the prior art, for example, the publication DE 10 2005 013 902 B3 is known. This relates to a closure, in particular for containers containing beverages, comprising a tubular base body which is tightly connected to the container in the area of a dispensing opening thereof. A cover is moveable on the base body in the opening and closing direction of the closure. A gas-tight closure element is provided for the dispensing opening. The closure element is permanently attached to the base body in the area of its circumferential outer edge and is also attached to the cover at a radial distance inside the outer edge between an outer circumferential edge portion and a central portion such that it can be cut through. When using containers equipped with the closure, greater safety is provided for the consumer both in terms of health and quality, while a manufacturer can produce the closure more economically and a bottler can have greater logistical flexibility It is the object of the invention to propose means (for example a closure) for preferably fluid-tight closing of a container filled with a substance, which has advantages over known closures.

In particular, embodiments of the invention are intended to enable the provision of the substance with particularly high quality by allowing simple and reliable inactivation of microorganisms present in the substance.

One embodiment of the invention relates to a pressure-transmission element, wherein the pressure-transmission element is fluid-tight. The pressure-transmission element is configured to form, together with a base body, a closure for fluid-tight closing of a vessel filled with a substance.

Embodiments of the invention provide that the pressure-transmission element is deflectable by pressurisation without incurring damage, for biological inactivation of microorganisms present in the substance.

Embodiments of the invention provide that the pressure-transmission element is deflectable without incurring damage, in a deflection direction by a distance of at least 0.25 in relation to dimensions of the pressure-transmission element in a relaxed state which are present at an angle in the deflection direction.

Embodiments of the invention provide that the pressure-transmission element is made of an elastic material or is elastically formed.

Embodiments of the invention provide that the pressure-transmission element is attachable to the base body in a fluid-tight manner.

Embodiments of the invention provide that the pressure-transmission element is present as a pressure membrane.

Embodiments of the invention provide that the pressure-transmission element comprises a folding bellows.

Embodiments of the invention provide that the folding bellows comprises 2 to 5, preferably 3 to 4, internal folds.

Embodiments of the invention provide that the pressure membrane is extensible without incurring damage to at least 200%, at least 250%, at least 300%, at least 400%, at least 500% or at least 600% of its area.

Embodiments of the invention provide that the pressure-transmission element is configured to be clamped between the base body and the vessel.

A suitable implementation can be a corresponding configuration in which the pressure-transmission element can be clamped accordingly. In particular, such a configuration can also permit the introduction of high pressures and at the same time allow a particularly simple and efficient method for filling a correspondingly designed container.

Embodiments of the invention provide that the pressure-transmission element is configured as a separate element that is not firmly connected to the base body.

Embodiments of the invention provide that the pressure-transmission element has a longitudinal axis.

Embodiments of the invention provide that the pressure-transmission element is rotationally symmetric with respect to the longitudinal axis.

This may be particularly advantageous for methods using the corresponding pressure-transmission element, as these do not require attention to the radial orientation of the pressure-transmission element, which simplifies the design of such processes.

Embodiments of the invention provide that the folding bellows comprises straight portions that are essentially parallel to a plane that is perpendicular to the longitudinal axis.

Embodiments of the invention provide that the pressure-transmission element comprises a connecting portion.

Embodiments of the invention provide that the connecting portion is configured to be clamped between the base body and the vessel.

Embodiments of the invention provide that the connecting portion comprises a planar portion that is at least essentially parallel to a plane that is perpendicular to the longitudinal axis.

Embodiments of the invention provide that the planar portion has an extension in radial direction of from 2 mm to 8 mm, preferably 3 mm to 5 mm.

Embodiments of the invention provide that the connecting portion comprises an angled portion arranged at an angle to the planar portion.

By means of a corresponding angled portion, in particular a defined stop on a correspondingly configured stop surface can be achieved, which can be advantageous for introduction of a pressure.

Embodiments of the invention provide that the angled portion is arranged radially further outwards than the planar portion.

Embodiments of the invention provide that for the pressure-transmission element the directions distal and proximal are defined along the longitudinal axis, wherein proximal points towards an interior of the vessel in the intended use whereas distal is opposite thereto.

Embodiments of the invention provide that the angled portion extends proximally from the planar portion.

Embodiments of the invention provide that the folding bellows is proximal to the planar portion.

Embodiments of the invention provide that the pressure-transmission element comprises a transition portion arranged between the planar portion and the folding bellows.

Embodiments of the invention provide that the transition portion is arranged radially further outwards than the radially outermost portion of the folding bellows.

Embodiments of the invention provide that the angled portion is configured to abut a stop element of the base body when connected to the base body.

Embodiments of the invention provide that the pressure-transmission element has an extension perpendicular to the longitudinal axis ranging from 20 mm to 60 mm, preferably in the 30 mm to 50 mm range, and more preferably in the 35 mm to 45 mm range.

Embodiments of the invention provide that the pressure-transmission element is configured to expand in all 3 dimensions when pressurised. This extension can, for example, be similar to the expansion of a balloon.

Embodiments of the invention provide that the pressure-transmission element is configured to be compressed upon decompression. In other words, the pressure-transmission element may be pressed together gain upon depressurisation (for example, when a high pressure of, for example, 6000 bar is released).

Another embodiment of the invention is directed to a base body. The base body is configured to form, together with the pressure-transmission element described above, a closure for fluid-tight sealing of a vessel filled with a substance.

Embodiments of the invention provide that the base body is rigid.

Embodiments of the invention provide that a screw thread is formed on the base body for attachment to the vessel.

Embodiments of the invention provide that the screw thread is configured as an internal thread.

Embodiments of the invention provide that the base body has a longitudinal body axis along which the proximal and distal directions are defined, wherein proximal, in the intended use, points towards an interior of the vessel and distal is opposite thereto.

Embodiments of the invention provide that the screw thread runs around the longitudinal body axis by more than 250°, preferably by more than 300°, and more preferably by more than 350°.

Embodiments of the invention provide that the screw thread runs around the longitudinal body axis by no more than 450°, preferably by no more than 430°, more preferably by no more than 4000.

Embodiments of the invention provide that the base body comprises at least one tamper-evident element.

By means of a tamper-evident element, it can in particular be possible to ensure that the base body is attached to a container only once. Thus, the tamper-evident element can provide a first opening guarantee. A user who sees a base body with an intact tamper-evident element can therefore assume that the base body has not yet been opened.

Embodiments of the invention provide that the at least one tamper-evident element is a plurality of tamper-evident elements.

Such a configuration of a defined number of discrete tamper-evident elements can be particularly advantageous in order to be able to reliably guarantee tamper-evidence.

Embodiments of the invention provide that the plurality of tamper-evident elements comprises two tamper-evident elements which are arranged 180° displaced from each other with respect to the longitudinal body axis.

Embodiments of the invention provide that each tamper-evident element comprises a wedge structure.

Embodiments of the invention provide that each tamper-evident element comprises an undercut at a wider end of the wedge structure.

Embodiments of the invention provide that each tamper-evident element comprises a predetermined breaking area.

Embodiments of the invention provide that no material of the base body is provided directly proximal and directly distal to each tamper-evident element.

Embodiments of the invention provide that the base body is configured to be attached to the vessel without damage the at least one tamper-evident element and to be separated from the vessel with damage to at least one of the at least one tamper-evident element.

Embodiments of the invention provide that the at least one tamper-evident element is arranged proximally of the screw thread.

Embodiments of the invention provide that at least two of the tamper-evident elements are arranged at different positions along the longitudinal body axis.

In other words, the, for instance, two tamper-evident elements (which may also be generally referred to as originalities) may thus have a height offset. Such an arrangement of the tamper-evident elements may be particularly advantageous. For example, a corresponding base body (or generally: a corresponding closure) can also be used in combination with a vessel made of glass. Glass has, however, relatively imprecise manufacturing tolerances. Placing the tamper-evident elements at different axial positions (i.e. at different "heights") can result in particular in the originality also being reliably indicated for vessels with imprecise manufacturing tolerances, such as glass. In embodiments where a thread is provided it should be understandable that the thread has an incline. Therefore, the height of the thread flanks will be different on opposite sides. Also for this reason, it may be advantageous to arrange the tamper-evident elements at different heights, as this allows a certain distance from the thread to be maintained, which in turn prevents damage to the tamper-evident elements when the closure is unscrewed (in the sense of: closing the container).

Embodiments of the invention provide that the body comprises a stop element that is configured so that a portion of the pressure-transmission element can abut there against.

In other words, for example, the previously discussed angled portion of the pressure-transmission element can abut the stop element. In this way, the corresponding portion can be arranged in a defined manner on the base body when used in the intended way, which facilitates suitable pressurisation.

Embodiments of the invention provide that the stop element is arranged distally from the screw thread.

Embodiments of the invention provide that the stop element has a smaller radial extension than the screw thread.

Embodiments of the invention provide that the base body has an overall height along the longitudinal body axis that is in the range of 8 mm to 20 mm, preferably in the 10 mm to 15 mm range, more preferably in the 12 mm to 14 mm range.

This allows the base body to comprise a relatively low overall height, which reduces the amount of material required compared to known closures. In particular, the described design of the tamper-evident elements can allow the base body to have a correspondingly compact design.

Embodiments of the invention provide that the base body is configured such that the at least one tamper-evident element damaged by separation from the vessel is attached to the remainder of the base body. This means, the at least one tamper-evident element damaged by the opening will also remain on the base body and can be removed from the vessel with the base body, which can be advantageous for reasons of waste separation, for example.

Embodiments of the invention provide that the distal portion has an axial length along the longitudinal body axis in the range of 4 mm to 15 mm, preferably in the 6 mm to 10 mm range, and more preferably in the 7 mm to 9 mm range.

Embodiments of the invention provide that the lid surface comprises a protruding contact edge on an inner side.

Embodiments of the invention provide that the base body is formed in a materially uniform manner. This may allow a particularly simple design of the base body.

Embodiments of the invention provide that the base body is injection moulded.

Embodiments of the invention provide that the base body comprises a sheath element and a lid surface.

Embodiments of the invention provide that the sheath element comprises a distal portion and an adjoining proximal portion.

Embodiments of the invention provide that the distal portion is textured for improved handling.

Embodiments of the invention provide that the proximal portion has a length along the longitudinal body axis of from 2 mm to 10 mm, preferably from 3 mm to 7 mm, more preferably from 4 mm to 6 mm. Once again, a particularly compact design of the base body can be achieved in particular by the above measures.

Embodiments of the invention provide that the at least one tamper-evident element is provided in the proximal portion.

Another embodiment of the invention is intended as a closure for fluid-tight closing of a vessel filled with a substance, wherein the closure comprises a pressure-transmission element as described above.

Embodiments of the invention provide that the distance over which the pressure-transmission element can be deflected in the deflection direction without incurring damage, relative to dimensions of the closure in the same direction is at least 50%, at least 75%, at least 90%, at least 95% or at least 100%.

Embodiments of the invention provide that the closure comprises a base body as described above to which the pressure-transmission element can be or is attached in a fluid-tight manner.

It should be understandable that such a closure can have the advantages described above for the pressure-transmission element and for the base body.

Embodiments of the invention provide that the base body and the pressure-transmission element are formed integrally with each other.

Embodiments of the invention provide that the base body and the pressure-transmission element are formed in a materially uniform manner with each other.

Embodiments of the invention provide that the base body and the pressure-transmission element are made of different materials.

Embodiments of the invention provide that the base body and the pressure-transmission element are joined together by a material bond.

Embodiments of the invention provide that the base body and the pressure-transmission element are configured as separate elements.

Embodiments of the invention provide that the closure comprises a signal element which is intended and configured to change irreversibly when a target pressure is exceeded by a pressure present during pressurisation, so that the signal element comprises a first signal state before the pressure is exceeded and a second signal state after the pressure is exceeded.

Embodiments of the invention provide that the closure is screwable to the vessel.

Embodiments of the invention provide that the closure is configured such that the pressure-transmission element is held clamped between the vessel and the base body when the vessel is closed with the closure.

This means that in this state the pressure-transmission element, and in particular the connecting portion of the pressure-transmission element, contacts both the vessel and the base body.

Embodiments of the invention provide for the angled portion to abut the abutment element.

In other words, embodiments of the invention thus provide a closure for fluid-tight closure of a vessel filled with a substance. It is envisaged that the closure comprises a fluid-tight pressure-transmission element which can be deflected without being damaged, by application of pressure in order to biologically inactivate microorganisms present in the substance.

The closure is provided and configured for fluid-tight closure of the vessel, wherein the vessel and the closure are part of a container. The substance can be arranged or provided in the vessel. Usually, it is intended to first introduce the substance into the vessel and to subsequently close the vessel fluid-tight with the closure in such a way that the substance is reliably held in the vessel. Until the closure or respectively the container is opened, the closure thus permanently and continuously prevents the substance from escaping from the vessel and another substance, for example a fluid used during pressurisation, from entering the vessel. The closure therefore closes the vessel fluid-tight, also and especially during pressurisation. For example, the vessel comprises a filling aperture through which the substance can be introduced or is introduced into the vessel. This filling aperture is subsequently closed fluid-tight with the closure. For this purpose, the closure is fastened to the vessel.

In principle, the fastening can be done in any way. The closure can be configured as a lid. For example, the closure can be a screw cap or screw lid, i.e. it is screwed onto the vessel. For this purpose, the closure comprises a screw thread and the vessel comprises a corresponding counter thread. The screw thread can be provided as an internal thread and the counter thread as an external thread. A reverse design can, however, also be realised. Alternatively, it is of course also possible for the closure to be attached to the vessel with a material bond, for example by gluing, welding or the like.

The closure can also be in the form of a plug that is force-fitted to the vessel. In this case, the closure, in particular a base element of the closure to which the pressure compensation element is attached, comprises an elastic area that ensures the force-fit connection when the closure is placed at, on or in the vessel. In any case, it is important that the closure is fluid-tightly connected to the vessel in order to keep the substance in the vessel and to prevent the substance from emerging, in particular from leaking out of the vessel.

The vessel preferably comprises a rigid vessel wall which completely encloses an inner space of the vessel aside from the filling aperture. The inner space is intended and configured for receiving the substance. For example, the vessel comprises an essentially hollow cylindrical shape, in particular a hollow circular cylindrical shape. The vessel may, however, also comprise a spherical shape, at least in some areas. The vessel or respectively its vessel wall preferably consists of a rigid material which, for example, has a modulus of elasticity of at least 10,000 MPa, at least 30,000 MPa, at least 50,000 MPa, at least 60,000 MPa or at least 70,000 MPa. The vessel can, for example, be made of glass, i.e. it may be a glass container. In such a case, the vessel can also be referred to as hollow glass. For example, silicate glass can be used as the material for the vessel, in particular soda-lime glass or normal glass or borosilicate glass.

Particularly preferably, the vessel is intended and configured to hold a beverage. The beverage is for example in the form of a juice, in particular a fruit juice or vegetable juice. In this respect, the substance is a foodstuff and the vessel is intended to receive a foodstuff. The vessel is therefore preferably made of a food-safe material.

The closure, with which the vessel can be closed in a fluid-tight manner, comprises at least the pressure-transmission element, but preferably a base body and the pressure-transmission element. The base body is rigid and preferably serves to fasten the closure to the vessel. The pressure-transmission element is deflectable or respectively displaceable with respect to the base body. It can be attached to the base body in a fluid-tight manner and is itself also fluid-tight. The pressure-transmission element is configured in such a way that it is deflectable through pressurisation, namely with respect to the base body. It is further configured in such a way that it permits a deflection without damage that is sufficient for the biological inactivation of the microorganisms present in the substance. Deflection is also understood to mean, in particular, only partial deflection of the pressure-transmission element, which occurs, for example, in the case of pressure-induced deformation of the pressure-transmission element.

Particularly in the case of the foodstuff, for example the beverage, it is necessary to inactivate any microorganisms that may be present in the substance in order to ensure a high level of safety and a long shelf life of the foodstuff. Inactivation can for example be accomplished through pasteurisation, i.e. by heating the substance. However, heating can lead to a deterioration of the substance itself, for example to a change in taste. For this reason, the inactivation of the microorganisms is not to be carried out by heating, but by pressurisation. For this purpose, the pressure-transmission element of the closure is provided, which is deflectable, in particular with respect to the base body.

The pressure-transmission element thus serves to transfer the ambient pressure outside the vessel into the inner space and thus to create a pressure equalisation between the outside environment and the inner space. For example, normal pressure may be present in the inner space before pressurisation, i.e. a pressure at standard physical conditions. This pressure is 1013.25 hPa. The pressure in the inner space before pressurisation is, for example at most 1.1 bar or at most 1.2 bar. During pressurisation, the container comprising the vessel and the closure is pressurised with a pressure that is transferred to the inner space via the pressure-transmission element. Due to the pressure-transmission element, the same or at least almost the same pressure respectively internal pressure is present in the inner space as in the exterior environment. For example, the internal pressure in the inner space is at least 95%, at least 96%, at least 97%, at least 98% or at least 99% of the ambient pressure.

The ambient pressure can be adjusted during pressurisation in such a way that the internal pressure in the inner space is sufficient to biologically inactivate a certain proportion of microorganisms present in the substance. A certain proportion means, for example, at least 90%, at least 95% or more of the microorganisms. In particular, the pressurisation may reduce the total viable aerobic count by at least one of said values. Preferably, the pressure at which the pressurisation is carried out is at least 4,000 bar, at least 5,000 bar, at least 6,000 bar, at least 7,000 bar or at least 8,000 bar. In other words, the pressure during pressurisation is preferably adjusted in such a way that the internal pressure corresponds to at least one of the said values. For example, the pressurisation takes place over a period of time that is selected such that the desired proportion of microorganisms is biologically inactivated. Preferably, the period is at least 5 minutes, at least 10 minutes or at least 15 minutes.

The closure can be configured in such a way that the pressure-transmission element is deflected without incurring damage despite the high pressure acting on the pressure-transmission element during pressurisation. This means that the closure and, especially, the pressure-transmission element remain at least fluid-tight. Accordingly, the closure closes the container completely fluid-tight also during pressurisation, such that no fluid from the external environment can pass through the closure into the container, in particular not a fluid used for pressurisation, which surrounds the container during pressurisation, in particular completely.

It is particularly preferred that the pressure-transmission element is only elastically deflected during pressurisation. For example, the pressure-transmission element is in a first position before pressurisation. During pressurisation, it is deflected from the first position towards a second position without incurring damage. It can now be provided that the pressure-transmission element remains in its deflected position, i.e. in the second position, after pressurisation. However, it is particularly preferred that the pressure-transmission element is displaced at least in the direction of the first position, in particular into the first position, due to its elastic design. In this case, the pressure-transmission element is in the same position after the application of pressure as it was before the application of pressure, or at least almost in the same position, such that there is no visual impairment of the closure remaining from the pressurisation.

For example, the pressure-transmission element is configured in such a way that it is deflected, in particular elastically, by a factor of at least 10, at least 100, at least 1,000, at least 2,000, at least 4,000 or more, without incurring damage, when the pressure is increased in the course of pressurisation compared to the pressure before pressurisation. In other words, during pressurisation, the damage-free deformation of the pressure-transmission element increases the internal pressure in the container by one of the factors mentioned.

The closure is preferably configured in such a way that the pressure-transmission element is displaceable in the direction of the vessel and/or into it. In particular, the pressure-transmission element is arranged and/or configured in such a way that it engages in the vessel at least in certain areas during pressurisation. For example, the closure is configured in such a way that the pressure-transmission element comes into contact, at least in certain areas, with the contents of the vessel, i.e. the substance present therein, during pressurisation.

The described configuration of the closure enables the reliable and fluid-tight closure of the vessel and at the same time the pressurisation of the substance contained in the vessel. Through pressurisation, any microorganisms potentially present in the substance can be biologically inactivated, so that a particularly safe provision of the substance can be realised. The substance is for example a solid, a liquid or a gas. The solid is, for example, a foodstuff, in particular fruit or vegetables, a medication or a cosmetic. The solid may be, for example, a powder. The liquid may be, for example, juice, in particular a fruit and/or vegetable juice. In this respect, the liquid can also be a foodstuff. Foodstuffs can be preserved by pressurisation, in particular without additional heat treatment respectively pasteurisation. This makes it possible to provide a foodstuff of particularly high quality.

A further embodiment of the invention provides that the pressure-transmission element can be deflected without being damaged in a certain deflection direction by a distance, in particular can be deflected elastically, which is at least 0.25, in particular at least 0.5, at least 0.55, at least 0.6, at least 0.65, at least 0.7 or at least 0.75 in relation to dimensions at an angle to the deflection direction of the pressure-transmission element in the relaxed state. The relaxed state of the pressure-transmission element is to be understood as a state or respectively position of the pressure-transmission element which is present before, in particular immediately before, the application of pressure or after the application of pressure. The deflection of the pressure-transmission element during pressurisation takes place in the deflection direction. The deflection direction is, for example, in the direction of a longitudinal centre axis of the closure or parallel to it.

Angled, i.e. at an angle greater than 0° and less than 180°, to the deflection direction, the pressure-transmission element has certain dimensions. Particularly preferably, the dimensions are in a direction perpendicular to the deflection direction. For example, the dimensions of the pressure-transmission element correspond to a diameter of the pressure-transmission element. The pressure-transmission element is configured in such a way that it can be deflected in the deflection direction without being damaged over a distance that is at least 0.25 times said dimensions of the pressure-transmission element. However, an even greater deflection of at least 0.5 times, at least 0.75 times the dimensions is preferred. The closure can also be configured in such a way that the pressure-transmission element is configured for damage-free deflection that corresponds at least to its dimensions. Thus, the pressure-transmission element may be configured for a substantial deflection to enable reliable biological inactivation of the microorganisms.

A further embodiment of the invention provides that a ratio of a volume between the deflected pressure-transmission element and an imaginary plane that at least partially accommodates the pressure-transmission element in its relaxed state to a surface content of the pressure-transmission element in its relaxed state measures at least 5 mm. In its relaxed state, the pressure-transmission element at least partially accommodates the imaginary plane. For example, an edge of the pressure-transmission element lies continuously in the imaginary plane. It is, however, also possible for the pressure-transmission element in its relaxed state to lie completely in the imaginary plane.

In its deflected state, i.e. during pressurisation, the pressure-transmission element encloses a certain volume with the plane. The ratio is calculated by dividing this volume by the surface area of the pressure-transmission element in the relaxed state. The ratio should have a value of at least 5 mm, preferably at least 10 mm, at least 15 mm or more. During pressurisation, there is accordingly a considerable increase in volume, i.e. a clear deflection of the pressure-transmission element into the vessel. This ensures reliable biological inactivation of the microorganisms.

A further development of the invention provides that the distance over which the pressure-transmission element can be deflected in the deflection direction without incurring damage is at least 50%, at least 75%, at least 90%, at least 95% or at least 100%. in relation to the dimensions of the closure in the same direction. This means that the pressure-transmission element is configured in such a way that it can penetrate the closure to a considerable extent during pressurisation without being damaged. For example, the base body extends in the direction of deflection from a first side to a second side, the first side and the second side delimiting the base body opposite each other.

Preferably, the pressure-transmission element is arranged closer to the first side than to the second side in the relaxed state, for example the distance between the pressure-transmission element and the first side is at most 5% or at most 10% of the total distance between the first side and the second side. The closure is configured in such a way that the pressure-transmission element is deflected in the direction of the second side during pressurisation and in doing so penetrates the base body in the direction of deflection by at least 50% or more. The pressure-transmission element can be configured in such a way that it allows a deflection in such a way, that it protrudes over the base body on the second side of the base body and insofar protrudes into the vessel. It is thus once again clear that the pressure-transmission element can be provided for a significant deflection.

A further embodiment of the invention provides that the pressure-transmission element consists of an elastic material or is elastically formed. The pressure-transmission element is therefore in any case elastic. For this purpose, it may be made of an elastic material, for example an elastomer. Additionally or alternatively, the elasticity of the pressure-transmission element results from its geometric design. For example, the pressure-transmission element can be provided in the form of a folding bellows or at least comprise such a folding bellows. The elastic design of the pressure-transmission element enables the pressure-transmission element to be deflected without incurring damage in a particularly simple manner.

A further embodiment of the invention provides that the closure comprises a rigid base body to which the pressure-transmission element is attached in a fluid-tight manner. Such an embodiment has already been mentioned. The base body ensures a reliable and fluid-tight connection of the closure to the vessel and here a secure fastening of the pressure-transmission element.

A further embodiment of the invention provides that the pressure-transmission element is in the form of a pressure membrane and/or comprises a folding bellows. The pressure membrane is to be understood, in particular, as an elastic membrane which is attached to the base body at the edge, in particular continuously and without interruption. Particularly preferably, the pressure membrane is round. Additionally or alternatively, the pressure-transmission element can comprise a folding bellows. In this case, the elasticity is achieved solely or at least partially by the configuration as folding bellows. The folding bellows can itself therefore be made of a nonelastic material or be made at least partially or completely of an elastic material. The folding bellows can comprise a constant material thickness throughout.

It can be provided that the folding bellows consists of the same material throughout, but is configured in such a way that it comprises a higher first stiffness in some areas and a lower second stiffness in some areas. The different stiffnesses can be achieved, for example, by means of different material thicknesses, so that the folding bellows comprises a greater first material thickness in some areas and a smaller second material thickness in some areas. Seen in cross-section, in particular in longitudinal cross-section, the folding bellows is formed by a meandering wall. This means that straight areas of the wall are connected to each other by curvatures, so that the areas run alternately in opposite directions.

Seen in cross-section, the longitudinal central axes of the straight portions are either parallel to or angled relative to the longitudinal central axis of the closure. Ultimately, the longitudinal central axes of the straight portions enclose an angle with the longitudinal central axis of the closure or a straight line parallel thereto which is at least 0° and at most 180°. For example, in a first embodiment, the angles for all the straight portions are either at least 0° and at most 45°, in particular greater than 0° and at most equal to 300 or at most equal to 15°. In a second embodiment, the angles for all straight portions are at least 300 and at most 90°, in particular at least 300 and less than 900 or at least 600 and less than 90°.

For example, the pressure-transmission element can be configured as a pressure membrane in some areas and as a folding bellows in others. However, it can also be provided that the pressure-transmission element comprises the folding bellows, which, however, consists of the elastic material. Each of the described designs of the pressure-transmission element ensures sufficient displaceability and thus reliable biological inactivation of the microorganisms.

A further embodiment of the invention provides that the pressure membrane can be stretched without incurring damage to at least 200%, at least 250%, at least 300%, at least 400%, at least 500% or at least 600% of the surface area. Particularly preferred are the larger values of at least 400% and more. The pressure membrane is thus configured in such a way that its surface can be stretched by the above-mentioned values in relation to its surface in the relaxed state as a result of the pressurisation. This ensures sufficient pressure equalisation between the external environment and the inner space of the vessel without damaging to the closure or the pressure-transmission element.

A further embodiment of the invention provides that the pressure-transmission element comprises a central middle piece which is deflectably connected to the base body via the folding bellows. The central middle piece is located centrally in the pressure-transmission element, in particular centrally in the closure. It can be deflected in relation to the base body to create the pressure equalisation. For this purpose, it is connected to the base body via the folding bellows.

In this respect, the folding bellows engages on the one hand, for example in a radial direction on the inside, on the middle piece, and on the other hand, in particular in a radial direction on the outside, the base body. In this way, a reliable and even deflection of the pressure-transmission element can be achieved.

A further embodiment of the invention provides for a screw thread formed on the base body for fastening to the vessel. It has already been pointed out that the closure is preferably screwed to the vessel and is thus configured as a screw cap. For this purpose, the screw thread is present on the base body, whereas the counter thread can be formed on the vessel. The screw thread is for example a GL40 thread. The screw thread enables a reversible fastening of the closure or respectively the base body to the vessel and thus a reversible closing of the vessel. In particular, it is provided that the closure can be detached from the vessel without being damaged after it has been attached to the vessel and after the pressurisation. This enables easy extraction of the substance, in particular easy consumption of the substance.

A further embodiment of the invention provides that the base body and/or the pressure-transmission element are made of metal and/or plastic. Preferably, the closure in its entirety is made of food-safe material or food-safe materials. Generally, the material can be metal or plastic. For example, the base body consists of a first material and the pressure-transmission element consists of a second material. It is therefore possible that the base body is made of metal and the pressure-transmission element is made of plastic, or vice versa. However, it is also possible that both the base body and the pressure-transmission element are made of metal or plastic. The use of metal or plastic enables a sufficiently stable design of the closure so that it reliably enables the pressure-transmission element to be deflected without incurring damage.

A further embodiment of the invention provides that the base body and the pressure-transmission element are formed integrally and in a materially uniform manner with each other, or that the base body and the pressure-transmission element are made of different materials and are joined to each other by a material bond. In the first case, the base body and the pressure-transmission element are made of the same material. They are also integrally made with each other, for example they are manufactured together with each other. Alternatively, the base body and the pressure-transmission element are made of different materials, whereby they are materially bonded to each other. For example, in this case the closure is manufactured in a 2K injection moulding process. The described design of the closure can enable a cost-effective and process-safe design.

A further embodiment of the invention provides that the closure is configured as a tamper-evident closure. This means that the closure is configured in such a way that when the container is opened, i.e. when the closure is removed from the vessel, or even just when the closure is moved in relation to the vessel, an irreversible change in the closure takes place, which can be easily recognised visually. A user or consumer can thus recognise whether the container has already been opened after pressurisation. Such an opening after pressurisation would allow intrusion new microorganisms into the substance. With the help of the tamper-evident closure, the consumer can now see whether he can safely consume the substance. Accordingly, a particularly high level of safety can be guaranteed.

A further embodiment of the invention provides a signal element which is intended and configured to change irreversibly when a target pressure is exceeded by a pressure present during pressurisation, so that the signal element has a first signal state before the target pressure is exceeded and a second signal state after the target pressure is exceeded. The signal element enables the user to easily detect whether the closure has already been subjected to pressurisation. For example, the irreversible change comprises a change in shape and/or a change in dimension of the signal element from the first signal state to the second signal state.

The signal element is configured in such a way that when the target pressure is exceeded by the ambient pressure in the vicinity of the closure and/or by the internal pressure in the inner space of the vessel and/or by a differential pressure between the ambient pressure and the internal pressure, the irreversible change of the signal element takes place. Before the target pressure is exceeded, the signal element is in the first signal state, and after the target pressure is exceeded, it is in the second signal state, which differ from one another, in particular with regard to a shape, a measurement and/or a colour of the signal element. In this way, the consumer can easily recognise whether the closure or the container has been subjected to pressurisation. This can further increase safety.

A further embodiment of the invention provides that the signal element comprises a latching element which interacts in a form-fitting manner with a latching counter-element before the target pressure is exceeded and is arranged and configured in such a way that it disengages from the latching counter-element when the target pressure is exceeded. For example, the latching element is subjected to at least part of the deflection of the pressure-transmission element relative to the latching counter-element, so that the latching element is deflected relative to the latching counter-element through pressurisation. The latching element and the latching counter-element engage with each other in such a way that they remain in engagement with each other until the target pressure is reached and will disengage from each other only when the target pressure is exceeded. They are arranged and configured in such a way that they no longer engage with each other even if the pressure subsequently drops below the target pressure.

A further embodiment of the invention provides that the signal element comprises a material-bonding element which is connected in a material-bonding manner to a material-bonding counter-element before the target pressure is exceeded and is arranged and configured in such a way that the material-bonding connection is irreversibly released when the target pressure is exceeded. The material-bonding element is fastened to the material-bonding counter-element in a material-bonding manner, for example by means of a connecting element which is formed integrally with the material-bonding element and the material-bonding counter-element. The connecting element is configured in such a way that it is destroyed when the target pressure is exceeded, in particular the connecting element tears. In this way, it can be ensured that the consumer can reliably detect whether the closure or the container has been exposed to the pressurisation.

A further embodiment of the invention provides that the pressure-transmission element is covered by a cover in which a pressure equalisation opening is formed. The cover is located on the side of the closure facing away from the vessel. The cover is, for example, part of the basic element. Preferably, the base element comprises the cover and a side part extending from the cover, which is cylindrical, in particular circular-cylindrical, and is provided and configured for fastening the closure to the vessel. It is in particularly preferable that there is a screw thread on an inner wall of the side part, which serves to screw the closure onto the vessel. In particular, the cover is arranged in such a way that it allows the pressure-transmission element to be deflected only in the direction of and/or into the vessel.

In the direction away from the vessel, the cover serves, for example, as an end stop for the pressure-transmission element. The pressure equalisation opening preferably comprises smaller dimensions than the pressure-transmission element. Preferably, the pressure-transmission element in its relaxed state is larger than a diameter of the pressure equalisation opening by a factor of at least 5, at least 7.5 or at least 10. Such a design of the cover also serves to protect the pressure-transmission element from external influences, in particular mechanical influences, so that damage to the pressure-transmission element after pressurisation, for example during distribution of the filled container, is effectively prevented.

A further embodiment of the invention is directed to a vessel, wherein the vessel is configured to be closed with a closure as described above.

Embodiments of the invention provide that the vessel is a glass vessel. This means, the vessel is configured as a glass vessel.

Embodiments of the invention provide that in a vessel head of the vessel there is a filling aperture which is closed by means of the closure, wherein dimensions of the filling aperture amount to at least 75% of the largest dimensions in the same direction of an inner space of the vessel adjoining the filling aperture.

Embodiments of the invention provide that the closure is screwable to the vessel.

Embodiments of the invention provide that the vessel has an internal volume in the range of 20 ml to 2000 ml, preferably in the range of 40 ml to 1200 ml, more preferably in the range of 50 ml to 500 ml.

Embodiments of the invention provide that the vessel has a longitudinal vessel axis along which the directions proximal and distal are defined, wherein distal, in intended use, points in the direction of the closure and proximal in the opposite direction.

Embodiments of the invention provide that the vessel comprises a connecting portion configured for connection to the closure.

Embodiments of the invention provide that the connecting portion is a distal end portion of the vessel.

Embodiments of the invention provide that the connecting portion comprises an external thread.

Embodiments of the invention provide that the vessel is configured to be connected to a closure comprising a base body comprising at least one tamper-evident element. The connecting portion may then comprise at least one counter element configured to interact with the at least one tamper-evident element.

Embodiments of the invention provide that the at least one counter element is a plurality of counter elements.

Embodiments of the invention provide that the counter-element comprises two counter-elements which are arranged 180° displaced from each other with respect to the longitudinal vessel axis.

Embodiments of the invention provide that each of the counter-elements is arranged at the same position along the longitudinal vessel axis. In other words, the counter-elements may be arranged at the same height on the vessel.

Embodiments of the invention provide that each of the at least one counter element is configured as a ramp element.

Counter-elements according to one or more of the above embodiments may be particularly suitable to interact with the described tamper-evident elements, thus ensuring originality.

Embodiments of the invention provide that the at least one counter element is arranged proximal to the external thread.

Embodiments of the invention provide that wherein the connecting portion has a length along the longitudinal vessel axis that is in the range of from 5 mm to 25 mm, preferably in the range of from 8 mm to 20 mm, more preferably in the range of from 10 mm to 15 mm.

Embodiments of the invention provide that a distal end of the connecting portion is configured as a planar annular surface.

A further embodiment of the invention also relates to a container with a vessel and with a closure which closes the vessel in a fluid-tight manner, the closure comprising a fluid-tight pressure-transmission element which is deflectable by pressurisation, without incurring damage, for biological inactivation of microorganisms present in the substance.

It should be clear that the container has advantages in line with the advantages described above.

Embodiments of the invention provide that the closure is a closure as described above.

Embodiments of the invention provide that the vessel is a vessel as described above.

Embodiments of the invention provide that the closure is screwed to the vessel.

Embodiments of the invention provide that the pressure-transmission element is held clamped between the vessel and the base body.

Embodiments of the invention provide that the folding bellows extends into the vessel.

Embodiments of the invention provide that the at least one tamper-evident element is undamaged.

In other words, embodiments of the invention also relate to a container with a vessel and with a closure which closes the vessel in a fluid-tight manner, in particular a closure according to the embodiments within the scope of this description. In this context, it is envisaged that the closure comprises a rigid base body and a fluid-tight pressure-transmission element which is attached to the base body in a fluid-tight manner and which can be deflected without being damaged by application of pressure (pressurisation) for biological inactivation of microorganisms present in the substance.

The advantages of such a design of the container or respectively the closure have already been pointed out. Both the container and the closure can be further configured according to the embodiments within the scope of this description, so that reference is made to these in this respect.

The container is provided with the vessel and the closure. The vessel can be closed fluid-tightly by means of the closure. The vessel and thus the container serve to hold the substance and are configured accordingly for this purpose. In any case, the vessel and the closure are configured to be fluid-tight. The closure enables pressure equalisation between the external environment and the inner space of the container by means of the pressure-transmission element in the manner already explained, so that, by pressurising the container, an internal pressure at which pressure any microorganisms present in the interior are inactivated can be provided in the inner space.

A further embodiment of the invention provides that the vessel is in the form of a glass vessel. In this respect, the vessel consists of glass at least in certain areas, but preferably completely. The glass vessel encloses the inner space together with the closure and separates it from the outside environment. The glass vessel is for example in the form of a hollow cylinder, preferably a hollow circular cylinder. In this respect, the glass vessel can also be referred to as a hollow glass. The use of glass as the material for the vessel has the advantage that food-safe properties are easily ensured. In contrast to other materials, in particular plastics, there is no—even very minor—passage of pollutants into the substance. In addition, the use of the glass vessel creates an extremely attractive visual impression.

A further embodiment of the invention provides that a filling aperture is present in a vessel head of the vessel, which aperture is closed by means of the closure, the dimensions of the filling aperture being at least 75% of the size dimensions in the same direction of an interior space adjoining the filling aperture. The vessel head is understood to be the portion of the vessel on which the closure is arranged and fastened. The vessel head encloses the filling aperture or respectively forms the filling aperture. Seen in cross-section, the vessel head completely and continuously delimits the filling aperture. The filling aperture is closed or at least closable by means of the closure. The filling aperture is adjoined by the inner space, which is delimited by the vessel together with the closure.

Seen in cross-section, the dimensions of the filling aperture are then almost as large as the dimensions of the inner space at the point where it has its largest dimensions in the same direction.

At least the dimensions of the filling aperture are at least 75% of the dimensions of the inner space. The dimensions of the filling aperture and the dimensions of the inner space are preferably determined in imaginary planes parallel to each other. The imaginary plane associated with the filling aperture is arranged, for example, in such a way that it continuously accommodates an edge bounding the filling aperture in the circumferential direction. In other words, the imaginary plane continuously accommodates an edge delimiting the end of the vessel. It is clear that the filling aperture comprises comparatively large dimensions and that the inner space widens only slightly in relation to the filling aperture. This ensures that reliable pressure equalisation between the external environment and the inner space can be achieved via the pressure-transmission element.

A further embodiment of the invention provides that the closure is screwed or screwable to the vessel. This has already been mentioned above. The screw cap enables reversible closure of the container, so that after pressurisation the closure can be removed from the container without incurring damage or at least almost without incurring damage.

A further embodiment of the invention provides that the pressure-transmission element is held clamped between the vessel and the base body when the vessel is closed with the closure. In this state, the pressure-transmission element lies on the one hand against the vessel, in particular against an edge of the vessel facing the base body, and on the other hand against the base body. The lid is preferably arranged and/or fastened to the vessel in such a way that the base body permanently presses the pressure-transmission element in the direction of the vessel or against the vessel. For example, the closure is attached to the vessel in such a way that the portion of the pressure-transmission element located between the vessel and the base body is compressed, in particular elastically compressed. In any case, with such a configuration, the pressure-transmission element can assume a sealing function, i.e. it can connect the vessel and the base element in a sealing manner, so that the contents of the container can be reliably prevented from escaping between the vessel and the base element.

One embodiment of the invention is also aimed at providing methods for filling a container with a substance, wherein the container comprises a vessel and a closure for fluid-tight closing of the vessel, wherein the closure comprises a fluid-tight pressure-transmission element and, after introduction of the substance into the vessel and after closure of the vessel by means of the closure, the pressure-transmission element is deflected by pressurisation without being damaged for biological inactivation of microorganisms present in the substance.

Embodiments of the invention provide that the container is a container as described above.

Embodiments of the invention provide that the closure is a closure as described above.

Embodiments of the invention provide that closing the vessel by means of the closure comprises the following steps: Attaching the pressure-transmission element to the vessel and attaching the base body to the vessel.

Embodiments of the invention provide that the steps of attaching the pressure-transmission element to the vessel and attaching the base body to the vessel are performed simultaneously.

Embodiments of the invention provide that the step of attaching the base body to the vessel is performed after the step of attaching the pressure-transmission element to the vessel. It is precisely the execution of the method in which these steps are carried out one after the other that can lead to a particularly simple automated method.

Embodiments of the invention provide that the method further comprises clamping the pressure-transmission element between the vessel and the base body.

In other words, embodiments of the invention also relate to a method for filling a container with a substance, the container comprising a vessel and a closure for fluid-tight sealing of the vessel, in particular a closure as described herein. It is envisaged that the closure comprises a rigid base body and a fluid-tight pressure-transmission element fluid-tightly attached to the base body, and that after the substance has been introduced into the vessel and after the vessel has been closed by means of the closure, the pressure-transmission element is deflected by pressurisation without being damaged for the biological inactivation of microorganisms present in the substance.

With regard to the advantages and possible advantageous embodiments of the closure and/or the container as well as the procedure for filling the container, reference is again made to the statements made in the context of this description.

Basically, the following steps are provided for filling the container with the substance: First, the vessel is prepared and the substance is introduced into the inner space of the vessel. Subsequently, the vessel is closed fluid-tight with the closure. The introduction of the substance into the inner space of the vessel and the closing of the vessel with the closure take place, for example, at a first pressure, which is also subsequently present in the inner space of the vessel.

The container is then pressurised. This is done in such a way that the pressure-transmission element of the closure is deflected without damage, namely in the direction of the inner space, in particular into the inner space. This results in an increase in pressure in the inner space. For example, the pressurisation takes place by increasing an ambient pressure above the first pressure. By means of the pressure-transmission element, pressure equalisation is achieved between the external environment and the inner space, so that the internal pressure present in the inner space of the vessel is also increased.

For example, the pressurisation is carried out in such a way that an internal pressure in the form of a second pressure is established in the inner space, which is greater than the first pressure by a factor of at least 1,000. Preferably, however, the factor is greater and is, for example, at least 3,000, at least 4,000, at least 5,000 or at least 6,000. Alternatively, pressurisation is carried out in such a way that the pressure present in the inner space is at least 4,000 bar, at least 5,000 bar, at least 6,000 bar, at least 7,000 bar or at least 8,000 bar. At such a pressure, microorganisms potentially present in the substance are biologically inactivated, so that a long shelf life of the substance is ensured.

A further embodiment of the invention provides that, after closing, the container is arranged in a pressure chamber and the pressure chamber is pressurised to such an extent that the microorganisms present in the substance are inactivated. This has already been explained above. The pressure chamber is configured in such a way that the pressurisation can be carried out in it. The use of the pressure chamber has the advantage that no direct mechanical influence on the container, and in particular on the pressure-transmission element, is required for the pressure to be applied. Rather, it suffices that the pressure chamber is pressurised in such a way that the pressure in the inner space of the vessel is sufficient to inactivate the microorganisms.

A further embodiment of the invention provides that the pressure is at least 4,000 bar, at least 5,000 bar, at least 6,000 bar, at least 7,000 bar or at least 8,000 bar. This has already been pointed out above. Additionally or alternatively, the period of time for which the pressure is maintained during pressurisation is at least 5 minutes, at least 10 minutes or at least 15 minutes. This usually ensures a reliable biological inactivation of the microorganisms to a sufficient extent. However, both the pressure and the duration can of course be chosen depending on the contents of the vessel, i.e. the substance, and also the volume of the substance. Different pressures and/or different durations may be necessary for different substances and for different volumes thereof.

In a further embodiment of the invention, it is provided that the vessel is one of a plurality of vessels arranged in the pressure chamber so that the plurality of vessels are pressurised simultaneously. Thus, it is envisaged that the pressure chamber is opened and the plurality of containers are placed therein. Subsequently, the pressure chamber is closed and the containers remain arranged in it. Then the pressure chamber is pressurised. Subsequently, the pressure chamber is opened and the containers are removed from it. This procedure has the advantage that an extremely high process safety is provided because the several containers are exposed to the same pressure.

A further embodiment of the invention provides that a volume of the substance introduced into the vessel is determined and the vessel is closed with the closure in such a way that a gas is enclosed in the vessel in addition to the substance. In other words, the vessel is not completely filled with the substance, but contains also the gas in addition to the substance after it has been closed with the closure. The gas is for example air, in particular purified and/or filtered air. However, a gas other than air can also be used, for example a noble gas, depending on the substance. The introduction of the gas into the vessel has the advantage of equalising the pressure in the inner space after the vessel is closed with the closure.

A further embodiment of the invention provides that the amount of gas introduced into the vessel is at least 1%, at least 2%, at least 3%, at least 4% or at least 5%, and at most 10%, at most 7.5% or at most 5% of the volume of the substance introduced into the vessel. After closing the vessel with the closure, the volume of gas present in the vessel is significantly less than the volume of substance in the vessel. The quantity of gas corresponds simultaneously to at least one of the values mentioned first and at most one of the values mentioned last. In this way, the vessel can be filled with the substance to a high degree. At the same time, the amount of gas is sufficient to compensate for temperature-related pressure fluctuations within the vessel.

A further embodiment of the invention provides that the pressure is determined in such a way that the gas and the substance are each compressed during pressurisation, wherein compression of the substance takes place by at least 2.5%, at least 5%, at least 7.5% or at least 10%. The pressure is understood to be the pressure used in the pressurisation in the external environment of the container, i.e. in particular the pressure present in the pressure chamber. The pressure is selected in such a way that both a volume reduction of the gas and a volume reduction of the substance occur. The volume reduction of the substance achieved by compressing the substance should be at least 2.5% or more. Since the gas is typically more compressible than the substance, the volume reduction effected for the gas is greater and is, for example, at least 80%, at least 90% or at least 95%. By compressing both the gas and the substance, effective inactivation of the microorganisms can be achieved.

In a further embodiment of the invention, the pressure chamber is filled with a liquid fluid for pressurisation. In order to be able to achieve the already mentioned high pressures or more, the liquid fluid, for example water, is used. The pressurisation can be carried out extremely effectively and efficiently by means of this fluid. In particular, the fluid in the liquid state of aggregation transmits the pressure almost directly and, above all, almost without being compressed itself.

A further embodiment of the invention provides that the pressurisation takes place at a temperature of at most 30° C., at most 25° C., at most 20° C., at most 15° C. or at most 10° C. The biological inactivation of the microorganisms should take place solely or at least almost solely by pressurisation, but in particular not by means of pasteurisation by application of temperature. During pressurisation, it is therefore ensured that the temperature remains low and corresponds at most to one of the values mentioned. By temperature is meant in particular the temperature of the substance. This ensures a high quality of the substance in the vessel.

Another embodiment of the invention is also generally oriented to a closure for closing a vessel filled with a substance.

Embodiments of the invention provide that the closure is rigid.

Embodiments of the invention provide that a screw thread is formed on the closure for attachment to the vessel.

Embodiments of the invention provide that the screw thread is configured as an internal thread.

Embodiments of the invention provide that the closure has a longitudinal closure axis along which the directions proximal and distal are defined, wherein proximal, in the intended use, points towards an interior of the vessel and distal is thereto.

Embodiments of the invention provide that the screw thread runs around the longitudinal closure axis by more than 250°, preferably by more than 300°, more preferably by more than 350°.

Embodiments of the invention provide that the screw thread runs around the longitudinal closure axis by no more than 450°, preferably by no more than 430°, more preferably by no more than 400°.

Embodiments of the invention provide that the closure comprises at least one tamper-evident element.

Embodiments of the invention provide that the at least one tamper-evident element is a plurality of tamper-evident elements.

Embodiments of the invention provide that the plurality of tamper-evident-elements comprises two tamper-evident-elements, which are arranged 180° displaced from each other in relation to the longitudinal closure axis.

Embodiments of the invention provide that each tamper-evident element comprises a wedge structure.

Embodiments of the invention provide that each tamper-evident element comprises an undercut at a wider end of the wedge structure.

Embodiments of the invention provide that each tamper-evident element comprises a predetermined breaking area.

Embodiments of the invention provide that no closure material is provided directly proximal and directly distal to each tamper-evident element.

Embodiments of the invention provide that the closure is configured to be attached to the vessel without damage to the at least one tamper-evident element and to be separated from the vessel with damage to at least one of the at least one tamper-evident element.

Embodiments of the invention provide that the at least one tamper-evident element is arranged proximal in relation to the screw thread.

Embodiments of the invention provide that at least two of the tamper-evident elements are arranged at different positions along the longitudinal closure axis.

Embodiments of the invention provide that the closure has an overall height along the longitudinal closure axis ranging from 8 mm to 20 mm, preferably ranging from 10 mm to 15 mm, more preferably ranging from 12 mm to 14 mm.

Embodiments of the invention provide that the closure is formed in a materially uniform manner.

Embodiments of the invention provide that the closure is injection moulded.

Embodiments of the invention provide that the closure comprises a sheath element and a lid surface, wherein the lid surface preferably does not comprise an opening.

Embodiments of the invention provide that the sheath element comprises a distal portion and an adjoining proximal portion.

Embodiments of the invention provide that the distal portion is structured for better handling.

Embodiments of the invention provide that the proximal portion has a length along the longitudinal closure axis of from 2 mm to 10 mm, preferably from 3 mm to 7 mm, more preferably from 4 mm to 6 mm.

Embodiments of the invention provide that the at least one tamper-evident element is provided in the proximal portion.

Embodiments of the invention provide that the closure is configured such that the at least one tamper-evident element damaged by separation from the vessel is attached to the remainder of the closure.

Embodiments of the invention provide that the distal portion has an axial length along the longitudinal closure axis in the range of 4 mm to 15 mm, preferably in the range of 6 mm to 10 mm, more preferably in the range of 7 mm to 9 mm.

The invention is also directed to a container with a closure as described above. The container additionally comprises a vessel which can have the features described herein, whereby it should be clear that this vessel is configured to be closed (in particular liquid-tight) with the closure described last and cannot necessarily also be closed with a closure with a pressure-transmission element. Nevertheless, it may have the further features (for example the features relating to the interaction with the at least one tamper-evident element) described above with reference to the vessel being connectable to a closure with pressure-transmission element. Furthermore, one embodiment of the invention is also directed to a correspondingly configured vessel.

This means that the closure and the vessel do not necessarily have to be configured with a pressure-transmission element. In particular, some of the embodiments described herein—for example, the design of the tamper-evident elements and the corresponding portion of the vessel—have also proven advantageous for other containers and closures that are configured without a pressure-transmission element.

The invention is also defined by the following aspects and embodiments.

In the following, reference is made to pressure-transmission element aspects. These are denoted by the letter "D" followed by a number, and these are also referred to as D aspects. When D aspects are referred to in the following, these aspects are meant.

- D1. Pressure-transmission element, wherein the pressure-transmission element is fluid-tight and configured to form, together with a base body, a closure for fluid-tight closing of a vessel filled with a substance.
- D2. Pressure-transmission element according to the preceding aspect, wherein the pressure-transmission element is deflectable by pressurisation without incurring damage, for biological inactivation of microorganisms present in the substance.
- D3. Pressure-transmission element according to any of the preceding D aspects, wherein the pressure-transmission element is deflectable without incurring damage, in a deflection direction by a distance which is at least 0.25 in relation to dimensions of the pressure-transmission element in a relaxed state which are present at an angle to the deflection direction.
- D4. Pressure-transmission element according to any of the preceding D aspects, wherein the pressure-transmission element is made of an elastic material or is elastically formed.
- D5. Pressure-transmission element according to any of the preceding D aspects, wherein the pressure-transmission element is attachable to the base body in a fluid-tight manner.
- D6. Pressure-transmission element according to any of the preceding D aspects, wherein the pressure-transmission element is present as a pressure membrane.
- D7. Pressure-transmission element according to any of the preceding D aspects, wherein the pressure-transmission element comprises a folding bellows.
- D8. Pressure-transmission element according to the preceding aspect, wherein the folding bellows comprises 2 to 5, preferably 3 to 4, internal folds.
- D9. Pressure-transmission element according to any of the preceding D aspects, comprising the features of aspect D6, wherein the pressure membrane is extensible, without incurring damage, to at least 200%, at least 250%, at least 300%, at least 400%, at least 500% or at least 600% of the area.
- D10. Pressure-transmission element according to any of the preceding D aspects, wherein the pressure-transmission element is configured to be clamped between the base body and the vessel.
- D11. Pressure-transmission element according to any of the preceding D aspects, wherein the pressure-transmission element is configured as a separate element which is not firmly connected to the base body.
- D12. Pressure-transmission element according to any of the preceding D aspects, wherein the pressure-transmission element has a longitudinal axis.
- D13. Pressure-transmission element according to the preceding aspect, wherein the pressure-transmission element is rotationally symmetric with respect to the longitudinal axis.
- D14. Pressure-transmission element according to any of the preceding D aspects, comprising the features of aspects D7 and D12, wherein the folding bellows comprises straight portions that are essentially parallel to a plane that is perpendicular to the longitudinal axis.
- D15. Pressure-transmission element according to any of the preceding D aspects, wherein the pressure-transmission element comprises a connecting portion.
- D16. Pressure-transmission element according to the preceding aspect and comprising the features of aspect D10, wherein the connecting portion is configured to be clamped between the base body and the vessel.
- D17. Pressure-transmission element according to any of the 2 preceding aspects and comprising the features of aspect D12, wherein the connecting portion comprises a planar portion that is at least essentially parallel to a plane that is perpendicular to the longitudinal axis.
- D18. Pressure-transmission element according to the preceding aspect, wherein the planar portion has an extension in the radial direction of from 2 mm to 8 mm, preferably from 3 mm to 5 mm.
- D19. Pressure-transmission element according to any of the preceding D aspects, comprising the features of aspect D17, wherein the connecting portion comprises an angled portion arranged at an angle to the planar portion.
- D20. Pressure-transmission element according to the preceding aspect, wherein the angled portion is arranged radially further outward than the planar portion.
- D21. Pressure-transmission element according to any of the preceding D aspects, comprising the features of aspect D12, wherein for the pressure-transmission element the directions distal and proximal are defined along the longitudinal axis, wherein proximal, in intended use, points towards an interior of the vessel and distal is opposite thereto.
- D22. Pressure-transmission element according to any of the preceding D aspects, comprising the features of aspects D19 and D21, wherein the angled portion extends proximally from the planar portion.
- D23. Pressure-transmission element according to any of the preceding D aspects, comprising the features of aspects D7, D17 and D21, wherein the folding bellows is proximal to the planar portion.
- D24. Pressure-transmission element according to any of the preceding D aspects, comprising the features of aspects D17 and D7, wherein the pressure-transmission element comprises a transition portion arranged between the planar portion and the folding bellows.
- D25. Pressure-transmission element according to the preceding aspect, wherein the transition portion is arranged radially further outward than the radially outermost portion of the folding bellows.
- D26. Pressure-transmission element according to any of the preceding D aspects, comprising the features of aspect D19, wherein the angled portion is configured to abut a stop element of the base body when connected to the base body.
- D27. Pressure-transmission element according to any of the preceding D aspects, comprising the features of aspect D12, wherein the pressure-transmission element has an extension perpendicular to the longitudinal axis which is in the range of from 20 mm to 60 mm, preferably in the range of from 30 mm to 50 mm, more preferably in the range of from 35 mm to 45 mm.
- D28. Pressure-transmission element according to any of the preceding D aspects, wherein the pressure-transmission element is configured to expand in all 3 dimensions when pressurised.

D29. Pressure-transmission element according to any of the preceding D aspects, wherein the pressure-transmission element is configured to be compressed upon decompression.

Hereinafter, reference is made to base body aspects. These are indicated by a G followed by a number and are also referred to as G aspects. When G aspects are referred to in the following, these aspects are meant.

G1. A base body, wherein the base body is configured to form, together with the pressure-transmission element according to any of the preceding D aspects, a closure for fluid-tight sealing of a vessel filled with a substance.

G2. Base body according to aspect G1, wherein the base body is rigid.

G3. Base body according to any of the preceding G aspects, wherein a screw thread is formed on the base body for attachment to the vessel.

G4. Base body according to the preceding aspect, wherein the screw thread is configured as an internal thread.

G5. Base body according to any of the preceding G aspects, wherein the base body has a longitudinal body axis along which the directions proximal and distal are defined, wherein proximal, in the intended use, points towards an interior of the vessel and distal is opposite thereto.

G6. Base body according to the preceding aspect and comprising the features of aspect G3, wherein the screw thread runs around the longitudinal body axis by more than 250°, preferably by more than 300°, more preferably by more than 350°.

G7. Base body according to any of the preceding G aspects and comprising the features of aspects G3 and G5, the screw thread running around the longitudinal body axis by not more than 450°, preferably by not more than 430°, more preferably by not more than 400°.

G8. Base body according to any of the preceding G aspects, wherein the base body comprises at least one tamper-evident element.

G9. Base body according to the preceding aspect, wherein the at least one tamper-evident element is a plurality of tamper-evident elements.

G10. Base body according to the preceding aspect and comprising the features of aspect G5, wherein the plurality of tamper-evident elements comprises two tamper-evident elements arranged 180° displaced from each other with respect to the longitudinal body axis.

G11. Base body according to any of the preceding G aspects, comprising the features of aspect G8, wherein each tamper-evident element comprises a wedge structure.

G12. Base body according to the preceding aspect, wherein each tamper-evident element comprises an undercut at a wider end of the wedge structure.

G13. Base body according to any of the preceding G aspects, comprising the features of aspect G8, wherein each tamper-evident element comprises a predetermined breaking area.

G14. Base body according to any of the preceding G aspects, comprising the features of aspects G8 and G5, wherein no base body material is provided directly proximal and directly distal to each tamper-evident element.

G15. Base body according to any of the preceding G aspects, comprising the features of aspects G8 and G3, wherein the base body is configured to be attached to the vessel without damage to the at least one tamper-evident element and to be separated from the vessel with damage to at least one of the at least one tamper-evident element.

G16. Base body according to any of the preceding G aspects, comprising the features of aspects G8, G3 and G5, wherein the at least one tamper-evident element is arranged proximally of the screw thread.

G17. Base body according to any of the preceding G aspects, comprising the features of aspects G9 and G5, wherein at least two of the tamper-evident elements are arranged at different positions along the longitudinal body axis.

G18. Base body according to any of the preceding aspects of G, wherein the base body comprises a stop element configured such that a portion of the pressure-transmission element can abut there against.

G19. Base body according to any of the preceding G aspects, comprising the features of aspects G18, G3 and G5, wherein the stop element is arranged distally of the screw thread.

G20. Base body according to any of the preceding G aspects, comprising the features of aspects G18 and G3, wherein the stop element has a smaller radial extension than the screw thread.

G21. Base body according to any of the preceding G aspects, comprising the features of aspect G5, wherein the base body has an overall height along the longitudinal body axis ranging from 8 mm to 20 mm, preferably ranging from 10 mm to 15 mm, more preferably ranging from 12 mm to 14 mm.

G22. Base body according to one of the preceding G aspects, wherein the base body is formed in a materially uniform manner.

G23. Base body according to one of the preceding G aspects, wherein the base body is injection moulded.

G24. Base body according to one of the preceding G aspects, wherein the base body comprises a sheath element and a lid surface.

G25. Base body according to the preceding aspect and comprising the features of aspect G5, wherein the sheath element comprises a distal portion and an adjoining proximal portion.

G26. Base body according to the preceding aspect, wherein the distal portion is textured for improved handling.

G27. Base body according to any of the preceding G aspects, comprising the features of aspect G25, wherein the proximal portion has a length along the longitudinal body axis of from 2 mm to 10 mm, preferably from 3 mm to 7 mm, more preferably from 4 mm to 6 mm.

G28. Base body according to any of the preceding G aspects, comprising the features of aspects G25 and G8, wherein the at least one tamper-evident element is provided in the proximal portion.

G29. Base body according to any of the preceding G aspects, comprising the features of aspect G15, wherein the base body is configured such that the at least one tamper-evident element damaged by separation from the vessel is attached to the remainder of the base body.

G30. Base body according to any of the preceding G aspects, comprising the features of aspect G25, wherein the distal portion has an axial length along the longitudinal body axis in the range of from 4 mm to 15 mm, preferably in the range of from 6 mm to 10 mm, more preferably in the range of from 7 mm to 9 mm.

G31. Base body according to any of the preceding G aspects, comprising the features of aspect G24, wherein the lid surface comprises a protruding contact edge on an inner side.

In the following, reference is made to closure aspects. These are denoted by a V followed by a number, and these are also referred to as V aspects. When V aspects are referred to in the following, these aspects are meant.

- V1. A closure for fluid-tight closing of a vessel filled with a substance, the closure comprising a pressure-transmission element according to one of the preceding D aspects.
- V2. Closure according to aspect V1, wherein the distance over which the pressure-transmission element can be deflected in the deflection direction without incurring damage, relative to dimensions of the closure in the same direction, is at least 50%, at least 75%, at least 90%, at least 95% or at least 100%.
- V3. Closure according to one of the preceding V aspects, wherein the closure comprises a base body according to one of the preceding G aspects, to which the pressure-transmission element can be or is attached in a fluid-tight manner.
- V4. Closure according to the preceding aspect, wherein the base body and the pressure-transmission element are formed integrally with each other.
- V5. Closure according to the preceding aspect, wherein the base body and the pressure-transmission element are formed in a materially uniform manner with each other.
- V6. Closure according to any of aspects V4 to V5, wherein the base body and the pressure-transmission element are made of different materials.
- V7. Closure according to the preceding aspect, wherein the base body and the pressure-transmission element are materially bonded to each other.
- V8. Closure according to the penultimate aspect, wherein the base body and the pressure-transmission element are configured as separate elements.
- V9. Closure according to one of the preceding V aspects, wherein the closure comprises a signal element which is intended and configured to change irreversibly when a target pressure is exceeded by a pressure present during pressurisation, so that the signal element comprises a first signal state before the pressure is exceeded and a second signal state after the pressure is exceeded.
- V10. Closure according to any of the preceding V aspects, wherein the closure is screwable to the vessel.
- V11. Closure according to one of the preceding V aspects, wherein the pressure-transmission element comprises the features of aspect D10, wherein the closure is configured such that, when the vessel is closed with the closure, the pressure-transmission element is held clamped between the vessel and the base body.

This means, in this condition, the pressure-transmission element, and in particular the connecting portion of the pressure-transmission element, contacts both the vessel and the base body.

- V12. Closure according to any of the preceding V aspects, wherein the pressure-transmission element comprises the features of aspect D26 and the base body comprises the features of aspect G18, wherein the angled portion abuts the stop element.

In the following, reference is made to vessel aspects. These are denoted by an H followed by a number, and these are also referred to as H aspects. When H aspects are referred to in the following, these aspects are meant.

- H1. A vessel, the vessel being configured to be fluid-tightly closed with a closure according to one of the preceding V aspects.
- H2. Vessel according to the preceding aspect, wherein the vessel is a glass vessel.

This means, the vessel is configured as a glass vessel.

- H3. Vessel according to one of the preceding H aspects, wherein a filling aperture is present in a vessel head of the vessel, which is closed by means of the closure, wherein dimensions of the filling aperture amount to at least 75% of the largest dimensions in the same direction of an interior space of the vessel adjoining the filling aperture
- H4. Vessel according to any of the preceding H aspects, wherein the closure is screwable to the vessel.
- H5. Vessel according to any of the preceding H aspects, wherein the vessel has an internal volume in the range of 20 ml to 2000 ml, preferably in the range of 40 ml to 1200 ml, more preferably in the range of 50 ml to 500 ml.
- H6. Vessel according to any of the preceding H aspects, wherein the vessel has a longitudinal vessel axis along which the directions proximal and distal are defined, wherein distal, in the intended use, points in the direction of the closure and proximal is opposite thereto.
- H7. Vessel according to any of the preceding H aspects, wherein the vessel comprises a connecting portion configured to be connected to the closure.
- H8. Vessel according to the preceding aspect and comprising the features of aspect H6, wherein the connecting portion is a distal end portion of the vessel.
- H9. Vessel according to any of the preceding H aspects and comprising the features of aspect H7, wherein the connecting portion comprises an external thread.
- H10. Vessel according to any of the preceding H aspects comprising the features of aspect H7, wherein the vessel is configured to be connected to a closure comprising a base body according to any of the preceding G aspects comprising the features of aspect G8, wherein the connecting portion comprises at least one counter element configured to interact with the at least one tamper-evident element.
- H11. Vessel according to the preceding aspect, wherein the at least one counter element is a plurality of counter elements.
- H12. Vessel according to any of the preceding H aspects and comprising the features of aspect H6, wherein the counter element comprises two counter elements arranged 180° displaced from each other with respect to the longitudinal vessel axis.
- H13. Vessel according to any of the 2 preceding H aspects and comprising the features of aspect H6, wherein each of the counter elements is arranged at the same position along the longitudinal vessel axis.
- H14. Vessel according to any of the preceding H aspects and comprising the features of aspect H10, wherein each of the at least one counter element is configured as a ramp element.
- H15. Vessel according to any of the preceding H aspects, comprising the features of aspects H10, H9 and H6, wherein the at least one counter element is arranged proximal to the external thread.
- H16. Vessel according to any of the preceding H aspects comprising the features of aspect H7 and H6, wherein the connecting portion has a length along the longitudinal vessel axis ranging from 5 mm to 25 mm, preferably ranging from 8 mm to 20 mm, more preferably ranging from 10 mm to 15 mm.

H17. Vessel according to any of the preceding H aspects, comprising the features of aspect H6 and H7, wherein a distal end of the connecting portion is configured as a planar annular surface.

In the following, reference is made to container aspects. These are denoted by a B followed by a number, and these are also referred to as B aspects. When B aspects are referred to in the following, these aspects are meant.

B1. A container comprising a vessel and a closure closing the vessel in a fluid-tight manner, the closure comprising a fluid-tight pressure-transmission element which is deflectable by pressurisation without incurring damage, for biological inactivation of microorganisms present in the substance.

B2. Container according to the preceding aspect, wherein the closure is a closure according to any of the preceding V aspects.

B3. Container according to any of the preceding B aspects, wherein the vessel is a vessel according to any of the preceding H aspects.

B4. Container according to any of the preceding B aspects, wherein the closure is screwed to the vessel.

B5. Container according to any of the preceding B aspects, wherein the closure comprises the features of aspect V11, wherein the pressure-transmission element is held clamped between the vessel and the base body.

B6. Container according to any of the preceding B aspects, wherein the pressure-transmission element of the closure comprises the features of aspect D7, wherein the folding bellows extends into the vessel.

B7. Container according to any of the preceding B aspects, wherein the base body of the closure comprises the features of aspect G8 and wherein the closure is attached to the vessel, wherein the at least one tamper-evident element is undamaged.

In the following, reference is made to method aspects. These are indicated by an M followed by a number, and these are also referred to as M aspects. When M aspects are referred to in the following, these aspects are meant.

M1. Method for filling a container with a substance, wherein the container comprises a vessel and a closure for fluid-tight closing of the vessel, the closure comprising a fluid-tight pressure-transmission element and, after introduction of the substance into the vessel and after closure of the vessel by means of the closure, the pressure-transmission element is deflected by pressurisation without incurring damage, for biological inactivation of microorganisms present in the substance.

M2. Method according to the preceding aspect, wherein the container is a container according to any of the preceding B aspects.

M3. Method according to any of the preceding M aspects, wherein the closure is a closure according to any of the preceding V aspects.

M4. Method according to any of the preceding M aspects, comprising the features of aspect M3, wherein the closure comprises the features of aspect V3, wherein closure of the vessel by means of the closure comprises the steps of:
attaching the pressure-transmission element to the vessel;
and attaching the base body to the vessel.

M5. Method according to the preceding aspect, wherein the steps of attaching the pressure-transmission element to the vessel and attaching the base body to the vessel are performed simultaneously.

M6. Method according to the penultimate aspect, wherein the step of attaching the base body to the vessel is performed after the step of attaching the pressure-transmission element to the vessel.

M7. Method according to any of the preceding V aspects, comprising the features of aspect M4, wherein the method further comprises clamping the pressure-transmission element between the vessel and the base body.

The invention is also defined by the following numbered embodiments.

1. Closure for fluid-tight closing of a vessel filled with a substance, characterized in that the closure comprises a fluid-tight pressure-transmission element which can be deflected by pressurization without incurring damage, for biological inactivation of microorganisms present in the substance.

2. Closure according to embodiment 1, characterised in that the pressure-transmission element is deflectable without incurring damage, in a deflection direction by a distance which is at least 0.25 in relation to the dimensions of the pressure-transmission element in a relaxed state at an angle to the deflection direction.

3. Closure according to one of the preceding embodiments, characterised in that the distance over which the pressure-transmission element can be deflected in the deflection direction without incurring damaged is at least 50%, at least 75%, at least 90%, at least 95% or at least 100% in relation to the dimensions of the closure in the same direction.

4. Closure according to one of the preceding embodiments, characterised in that the pressure-transmission element is made of an elastic material or is elastically formed.

5. Closure according to one of the preceding embodiments, characterised in that the closure has a rigid base body to which the pressure-transmission element can be or is fastened in a fluid-tight manner.

6. Closure according to one of the preceding embodiments, characterised in that the pressure-transmission element is present as a pressure membrane and/or comprises a folding bellows.

7. Closure according to one of the preceding embodiments, characterized in that the pressure membrane is extensible without incurring damage, to at least 200%, at least 250%, at least 300%, at least 400%, at least 500% or at least 600% of the area.

8. Closure according to one of the preceding embodiments, characterised by a screw thread formed on the base body for fastening to the vessel.

9. Closure according to one of the preceding embodiments, characterised in that the base body and the pressure-transmission element are formed integrally and in a materially uniform manner with each other, or in that the base body and the pressure-transmission element consist of different materials and are joined to one another in a materially bonded manner.

10. Closure according to one of the preceding embodiments, characterised by a signal element which is provided and configured to change irreversibly when a target pressure is exceeded by a pressure present during pressurisation, so that the signal element comprises a first signal state before the pressure is exceeded and a second signal state after the pressure is exceeded.

11. Container with a vessel and with a closure which closes the vessel in a fluid-tight manner, in particular a closure according to one or more of the preceding embodiments, characterised in that the closure comprises a fluid-tight pressure-transmission element which can be deflected by pressurisation without incurring damage, for biological inactivation of microorganisms present in the substance.
12. Container according to embodiment 11, characterised in that the vessel is present as a glass vessel.
13. Container according to one of the embodiments 11 or 12, characterised in that a filling aperture is present in a vessel head of the vessel and which is closed by means of the closure, wherein dimensions of the filling aperture amount to at least 75% of the largest dimensions in the same direction of an inner space of the vessel adjoining the filling aperture.
14. Container according to one of the embodiments 11 to 13, characterised in that the closure is screwed or screwable to the vessel.
15. Method for filling a container with a substance, in particular a container according to one or more of the embodiments 11 to 14, wherein the container comprises a vessel and a closure for fluid-tight closing of the vessel, in particular a closure according to one or more of the embodiments 1 to 10, characterized in that the closure comprises a fluid-tight pressure-transmission element and, after introduction of the substance into the vessel and after closure of the vessel by means of the closure, the pressure-transmission element is deflected by pressurisation without incurring damage, for biological inactivation of microorganisms present in the substance.

The invention is also defined by the aspects below.

W1. A closure for closing a vessel filled with a substance.
W2. Closure according to aspect W1, wherein the closure is rigid.
W3. Closure according to any of the preceding W aspects, wherein a screw thread is formed on the closure for attachment to the vessel.
W4. Closure according to the preceding aspect, wherein the screw thread is configured as an internal thread.
W5. Closure according to any of the preceding W aspects, wherein the closure has a longitudinal closure axis along which the directions proximal and distal are defined, wherein proximal points towards an interior of the vessel, when in intended use, and distal being is opposite thereto.
W6. Closure according to the preceding aspect and comprising the features of aspect W3, wherein the screw thread runs around the longitudinal closure axis by more than 250°, preferably by more than 300°, more preferably by more than 350°.
W7. Closure according to one of the preceding W aspects and comprising the features of aspects W3 and W5, the screw thread running around the longitudinal closure axis by not more than 450°, preferably by not more than 430°, more preferably by not more than 400°.
W8. Closure according to any of the preceding W aspects, wherein the closure comprises at least one tamper-evident element.
W9. Closure according to the preceding aspect, wherein the at least one tamper-evident-element is a plurality of tamper-evident-elements.
W10. Closure according to the preceding aspect and comprising the features of aspect W5, wherein the plurality of tamper-evident elements comprises two tamper-evident elements arranged 180° displaced from each other with respect to the longitudinal closure axis.
W11. Closure according to any of the preceding W aspects comprising the features of aspect W8, wherein each tamper-evident-element comprises a wedge structure.
W12. Closure according to the preceding aspect, wherein each tamper-evident element comprises an undercut at a wider end of the wedge structure.
W13. Closure according to any of the preceding W aspects, comprising the features of aspect W8, wherein each tamper-evident element comprises a predetermined breaking area.
W14. Closure according to any of the preceding W aspects, comprising the features of aspects W8 and W5, wherein no material of the closure is provided directly proximal and directly distal of each tamper-evident-element.
W15. Closure according to any of the preceding W aspects comprising the features of aspects W8 and W3, wherein the closure is configured to be attached to the vessel without damage to the at least one tamper-evident element and to be separated from the vessel with damage to at least one of the at least one tamper-evident element.
W16. Closure according to any of the preceding W aspects, comprising the features of aspects W8, W3 and W5, wherein the at least one tamper-evident element is arranged proximally of the screw thread.
W17. Closure according to any of the preceding W aspects comprising the features of aspects W9 and W5, wherein at least two of the tamper-evident-elements are arranged at different positions along the longitudinal closure axis.
W18. Closure according to any of the preceding W aspects comprising the features of aspect W5, wherein the closure has an overall height along the longitudinal closure axis ranging from 8 mm to 20 mm, preferably ranging from 10 mm to 15 mm, more preferably ranging from 12 mm to 14 mm.

W19. Closure according to any of the preceding W aspects, wherein the closure is formed in a materially uniform manner.

W20. Closure according to one of the preceding W aspects, wherein the closure is injection moulded.

W21. Closure according to one of the preceding W aspects, wherein the closure comprises a sheath element and a lid surface, wherein the lid surface preferably comprises no opening.

W22. Closure according to the preceding aspect and comprising the features of aspect W5, wherein the sheath element comprises a distal portion and an adjoining proximal portion.

W23. Closure according to the preceding aspect, wherein the distal portion is textured for improved handling.

W24. Closure according to any of the preceding W aspects, comprising the features of aspect W22, wherein the proximal portion has a length along the longitudinal closure axis of from 2 mm to 10 mm, preferably from 3 mm to 7 mm, more preferably from 4 mm to 6 mm.

W25. Closure according to any of the preceding W aspects comprising the features of aspects W22 and W8, wherein the at least one tamper-evident element is provided in the proximal portion.

W26. Closure according to any of the preceding W aspects comprising the features of aspect W15, wherein the closure is configured such that the at least one tamper-evident element damaged by separation from the vessel is attached to the remainder of the closure.

W27. Closure according to any of the preceding W aspects comprising the features of aspect W22, wherein the distal portion along the longitudinal closure axis has an axial length in the range of from 4 mm to 15 mm, preferably in the range of from 6 mm to 10 mm, more preferably in the range of from 7 mm to 9 mm.

W28. Container comprising a closure according to any of the preceding W aspects and comprising a vessel, wherein the vessel is preferably configured according to any of the preceding H aspects.

Figure 6D:
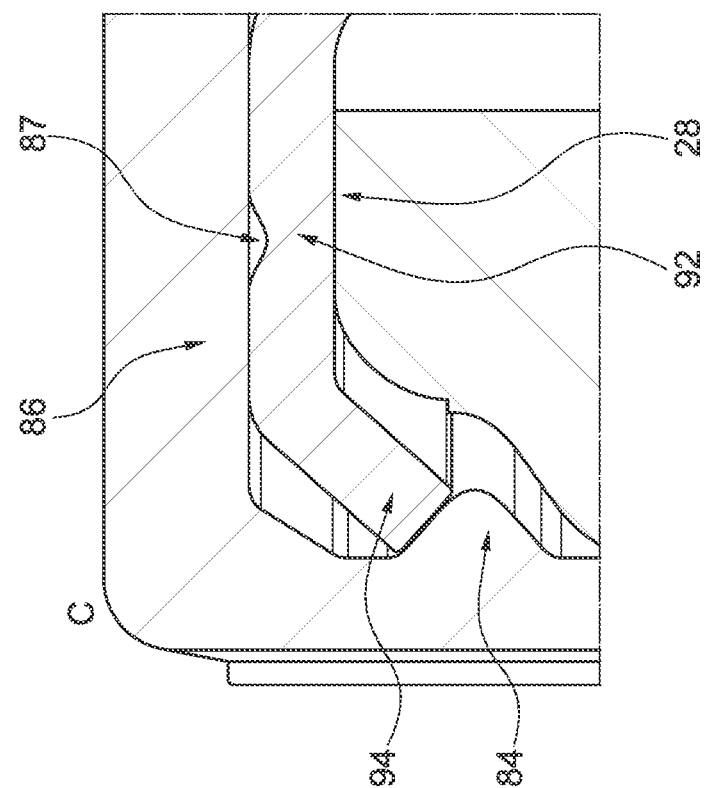
Figure 6D:
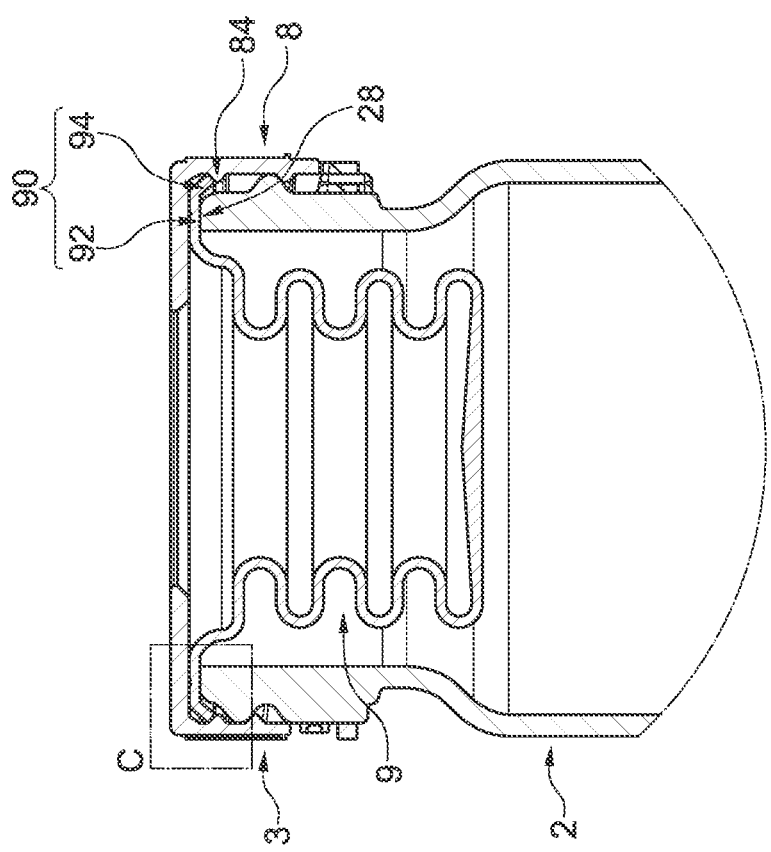
Figure 8E:
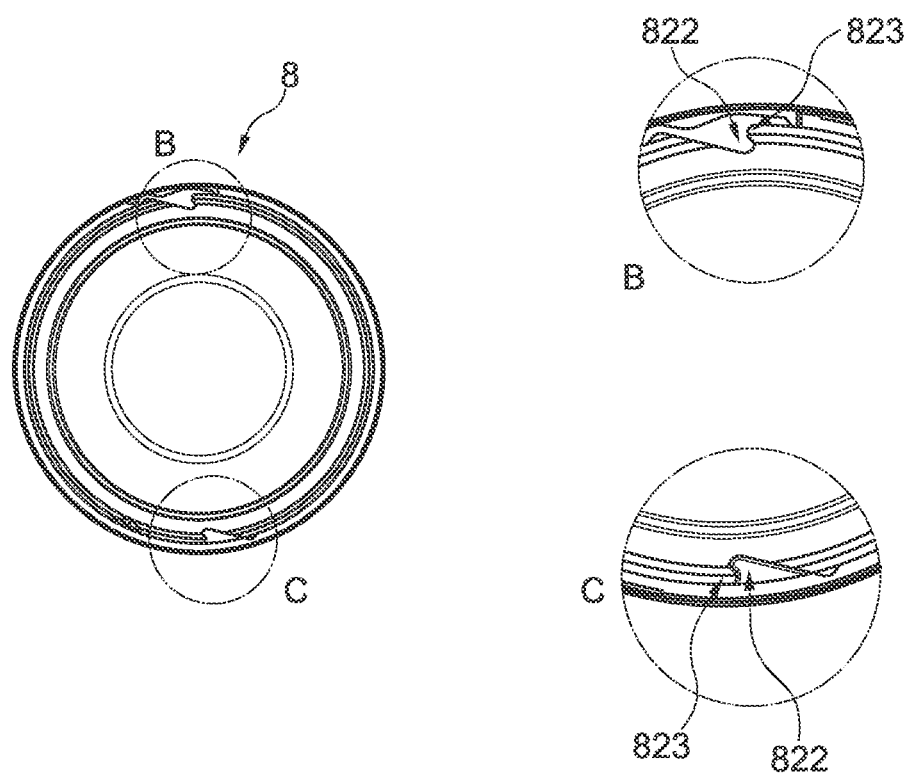
Figure 8F:
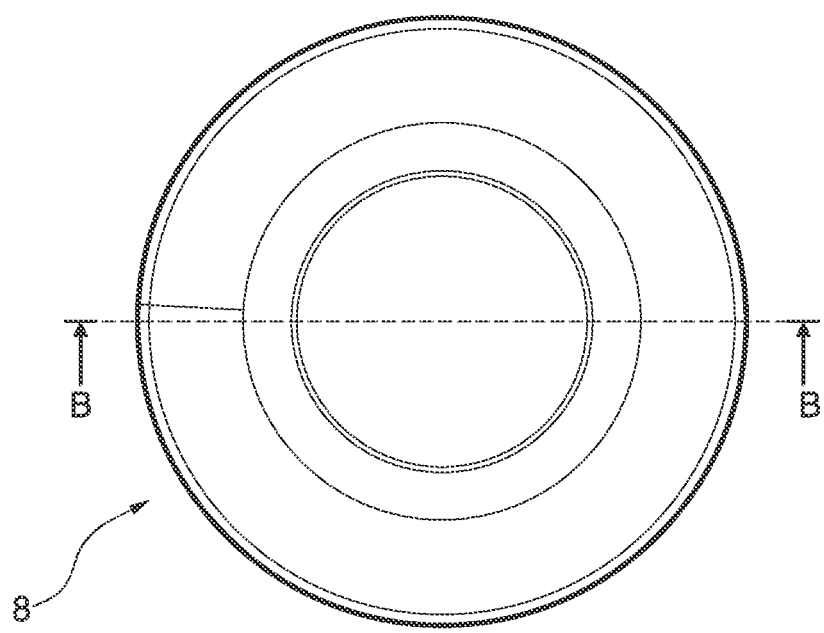
Figure 9A:
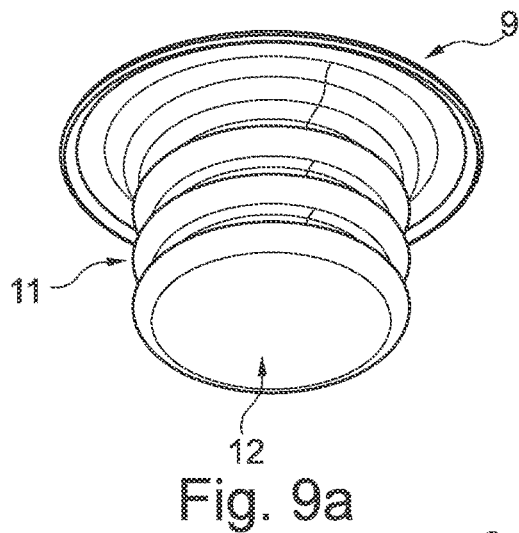
Figure 9B:
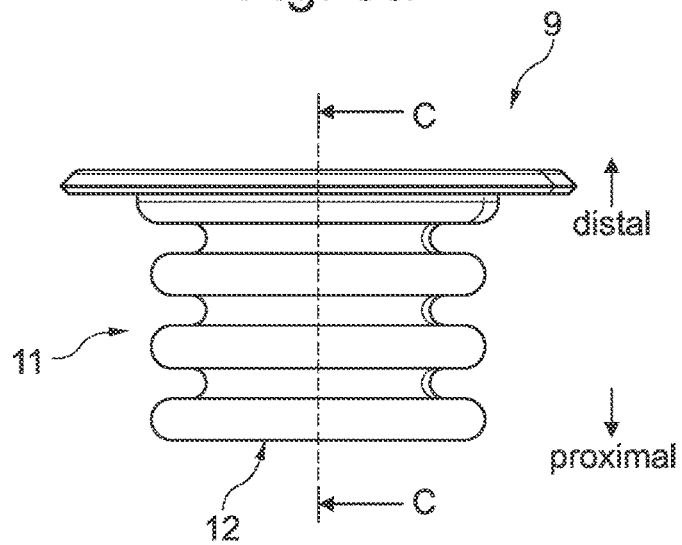
Figure 9C:
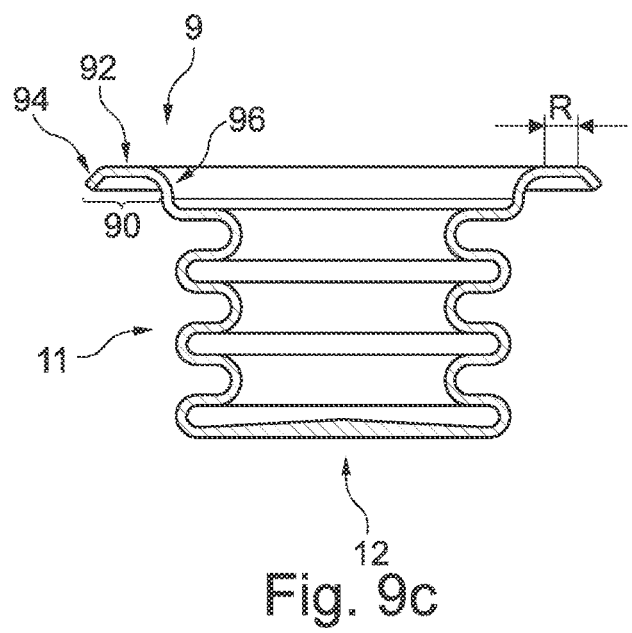
Figure 10:
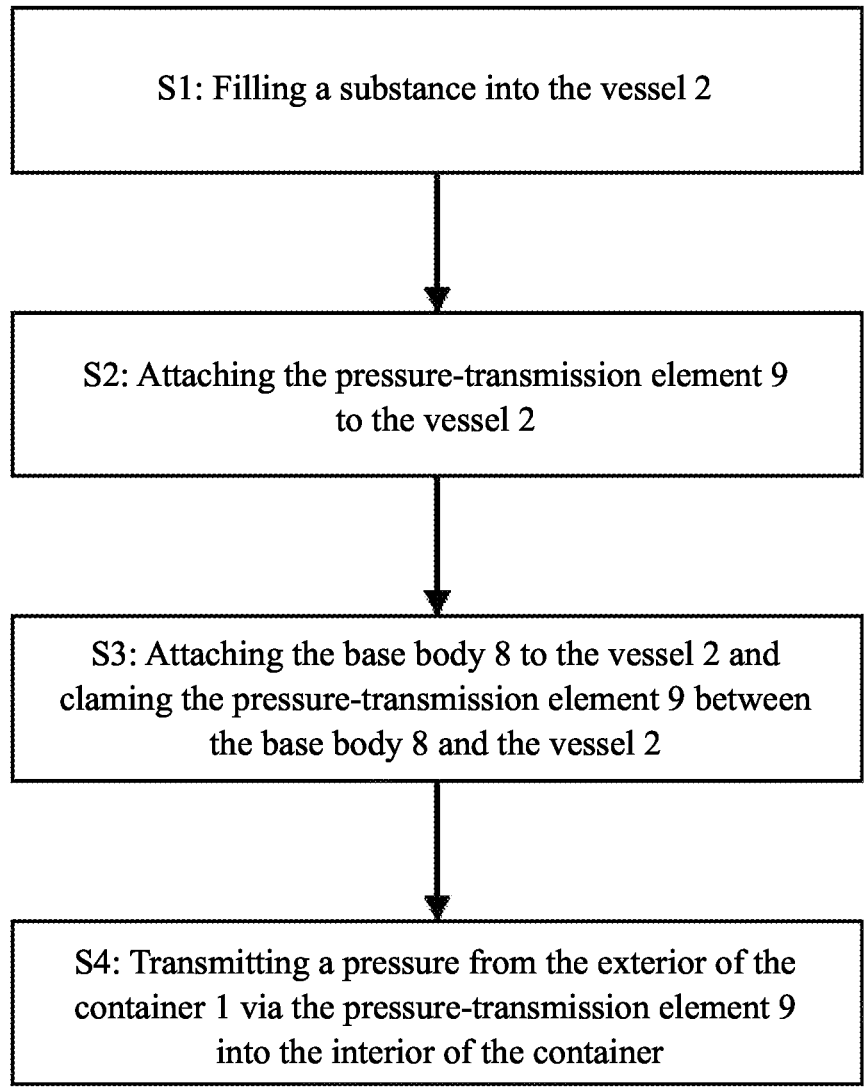

The invention is explained below with reference to the examples of embodiments shown in the drawings, without making any limitation on the invention. The different illustrations show FIG. 1 a schematic representation of a container for a substance, with a vessel and a closure, FIG. 2 a schematic representation of the closure in a first embodiment, and FIG. 3 a schematic representation of the closure in a second embodiment, FIG. 4 a schematic representation of the closure in a third embodiment, and FIG. 5 a schematic representation of the container with the closure in a fourth embodiment;

FIGS. 6a-6d various views of a container in a fifth embodiment, FIG. 6a being a perspective view of the container, FIG. 6b being a top exploded view of the container, FIG. 6c being a cross-sectional view of the container, and FIG. 6d being an enlarged view of region B of FIG. 6c (with FIG. 6d itself providing an enlarged view of region C on the right);

FIGS. 7a-7e various views of a vessel of the container according to the fifth embodiment, FIG. 7a being a first perspective view, FIG. 7b being a second perspective view rotated 900 about a longitudinal axis with respect to FIG. 7a, FIG. 7c being a first top view, FIG. 7d being a cross-section along A-A in FIG. 7c, and FIG. 7e being a second top view rotated 90° along the longitudinal axis with respect to the top view of FIG. 7c;

FIGS. 8a-8g various views of a base body of a closure of the container according to the fifth embodiment, whereby FIGS. 8a and 8b are different perspective views of the base body, FIG. 8c is a side top view of the base body, FIG. 8d is an enlarged view of the area D of FIG. 8c, FIGS. 8e represent various top views of an underside of the base body (the right-hand views being enlarged views of areas B and C of the left-hand view), FIG. 8f represents a top view of an upper side of the base body, and FIG. 8g represents a cross-section along the sectional plane shown in FIG. 8f;

FIGS. 9a-9c various views of a pressure-transmission element of a closure of a container according to the fifth embodiment, where FIG. 9a is a perspective view of the pressure-transmission element, FIG. 9b is a top view of the pressure-transmission element, and FIG. 9c is a cross-section along C-C in FIG. 9b;

FIG. 10 a flow diagram indicating a method according to one embodiment of the invention.

With regard to the drawings, it should be noted that not all reference signs are shown in all figures. Rather, for the sake of clarity, some of the figures are not provided with all the reference signs.

FIG. 1 shows a schematic representation of a container 1 comprising a vessel 2 and a closure 3. The vessel 2 and the closure 3 together enclose an inner space 4 in which in the depicted exemplary embodiment a substance 5, in the embodiment example shown here a liquid, and a gas 6 are present. The liquid 5 is for example a beverage, in particular a fruit and/or vegetable juice. The gas 6 is in particular air. When filling the container 1, it is intended to introduce the liquid 5 and the gas 6 into the inner space 4 and then to fasten the closure 3 to the vessel 2. The closure 3 is, for example, a screw cap, so that the closure 3 is screwed to the vessel 2 accordingly.

The container 1 is then subjected to pressurisation. For this purpose, it is preferably arranged in a pressure chamber in which a certain pressure is subsequently built up. The pressure level is selected such that the internal pressure in the inner space 4 of the container 1 is sufficient for the biological inactivation of any microorganisms present in the liquid 5. In order to enable reliable pressure equalisation between the pressure chamber or an external environment 7 of the container 1 and the inner space 4, the closure 3 comprises a pressure-transmission element 9 in addition to a rigid base body 8. Both are not shown here.

Figure 2:
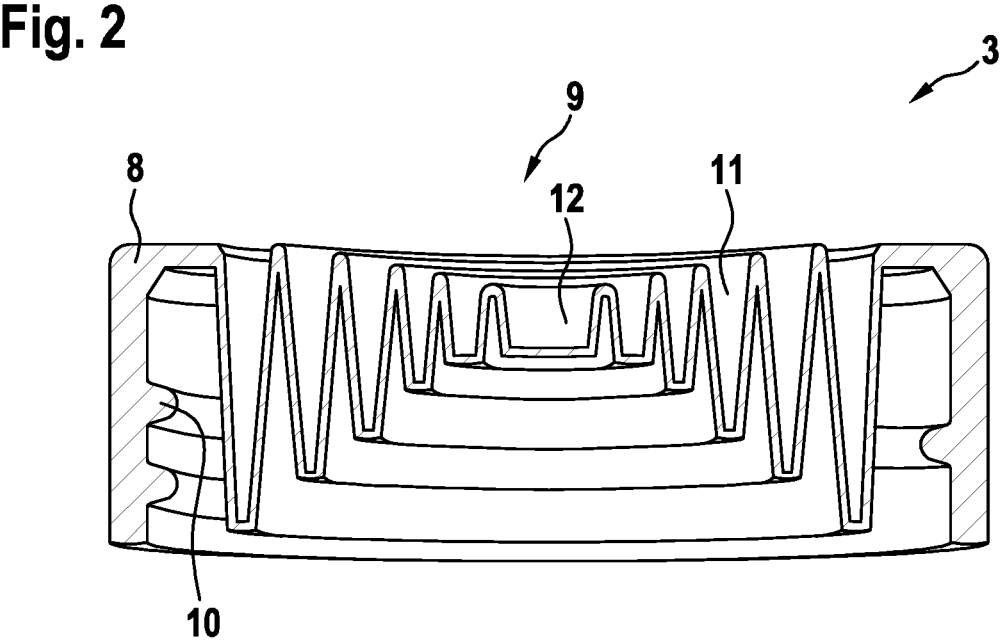

FIG. 2 shows a schematic representation of the closure 3 in a first embodiment, whereby the base body 8 and the pressure-transmission element 9 are visible. The base body 8 is essentially rigid. In the embodiment shown here, a screw thread 10 is formed on it, by means of which it can be screwed to the vessel 2. The pressure-transmission element 9 comprises a folding bellows 11 for pressure equalisation. A middle piece 12 is connected to the base body 8 via this folding bellows. When the container 1 is pressurised as described above, the pressure-transmission element 9 is deflected, namely in the direction of the vessel 2, in particular into the inner space 4. This is facilitated by the design of the pressure-transmission element 9 as a folding bellows 11.

Figure 3:
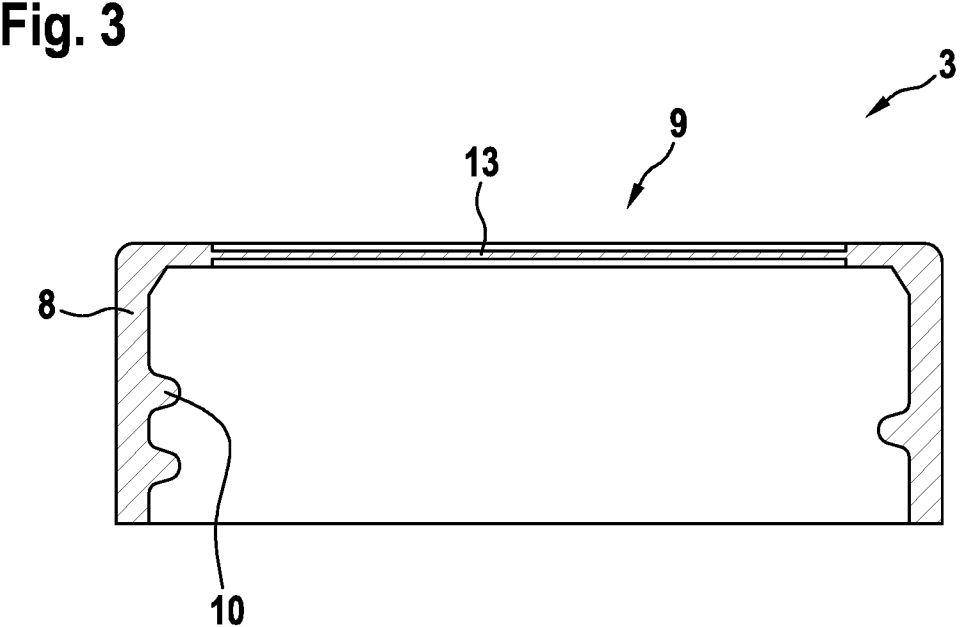

FIG. 3 shows a schematic representation of the closure 3 in a second embodiment. This is basically similar to the first embodiment, so that reference is made to the corresponding explanations and only the differences are discussed below. These are that the pressure-transmission element 9 does not comprise the folding bellows 11 and the middle piece 12, but is rather configured as a pressure membrane 13. The pressure membrane is preferably formed integrally and in a materially uniform manner with the base body 8. They can, for example, be made of the same material. In this case, the closure 3 can be manufactured by injection moulding or the like. It can, however, also be provided that the pressure membrane 13 consists of a material which is different from the material of the base body 8. In this case, it is also possible to manufacture the closure by means of injection nozzles, for example by using a two-component injection moulding process.

Figure 4:
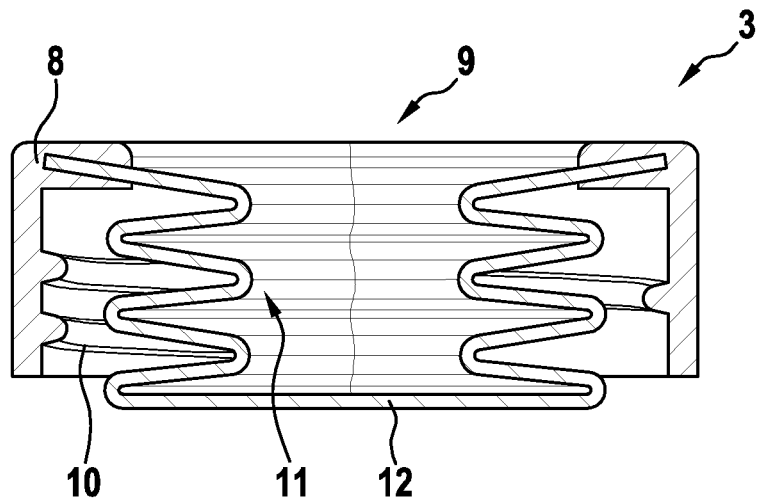

FIG. 4 shows the closure 3 in a third embodiment. This is basically similar to the first embodiment, so that reference is made to the corresponding explanations and only the differences are discussed below. These are that the folding bellows 11 of the pressure-transmission element 9 is oriented differently. While straight areas of the folding bellows 11 for the first embodiment are oriented almost parallel to a longitudinal centre axis of the closure 3, in the third embodiment they run almost perpendicular to the longitudinal centre axis. For example, while in the first embodiment an angle between longitudinal central axes of the straight portions and the longitudinal central axis of the closure 3 is at least 0°, in particular more than 0°, and at most 30°, at most 15°, at most 10° or at most 5°, for the third embodiment it is preferably at least 60°, at least 75°, at least 800 or at least 850 and at most 90°, in particular less than 90°.

Figure 5:
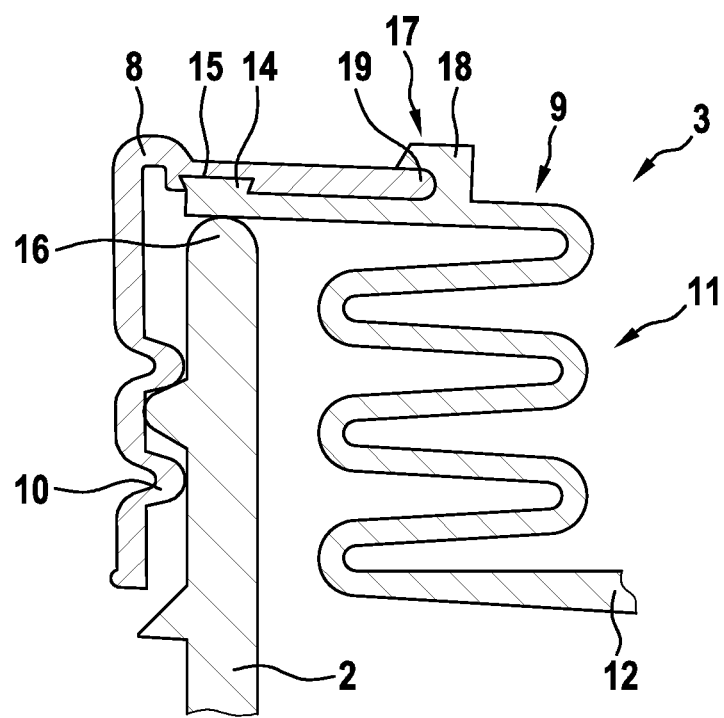

FIG. 5 shows a schematic representation of the container 1, whereby the vessel 2 is only indicated. The closure 3 is present in a fourth embodiment. This is basically similar to the third embodiment, so that reference is made to the corresponding explanations. However, whereas in the third embodiment the pressure-transmission element 9 can be provided in one piece with the base body 8, in the fourth embodiment the pressure-transmission element 9 is provided as a separate element which is attached to the base body 8. For example, the pressure-transmission element 9 is made of a different material than the base body 8.

Preferably, the pressure-transmission element 9 is form-fittingly attached to the base body 8. For this purpose, a retaining projection 14 of the pressure-transmission element 9 engages in a recess 15 of the base body 8. The retaining projection 14 is, for example, dovetailed, i.e. it widens out in the base body 8 so that a form-fitting connection is made between the pressure-transmission element 9 and the base body 8.

Furthermore, the pressure-transmission element 9 is preferably arranged in such a way that it is held clamped between the base body 8 and the vessel 2 when the container 1 is in a closed state, i.e. when the closure 3 is arranged on the vessel 2 for closing the filling aperture. Particularly preferably, the container 1 is configured in such a way that the retaining projection 14 is arranged to overlap with an edge 16 delimiting the filling aperture, so that the vessel 2, in particular the edge 16, forces the retaining projection 14 into the recess 15 or respectively holds it in the recess 15. On the one hand, this ensures reliable and permanent fastening of the pressure-transmission element 9 to the base body 8 when the container 1 is closed. On the other hand, the pressure-transmission element 9 achieves a sealing effect between the base body 8 and the vessel 2, so that the container 1 is particularly fluid-tight.

In the embodiment shown here, the closure 3 comprises a signal element 17. This is intended and configured to change irreversibly when a target pressure is exceeded by the pressure present during pressurisation. Accordingly, the signal element is to comprise a first signal state before the target pressure is exceeded and a second signal state after the target pressure is exceeded. The signal element 17 shown is provided with a latching element 18 which engages with a latching counter-element 19 prior to pressurisation.

In the present embodiment, the latching counter-element 19 is an edge of the base body 8. The latching element 18 engages around the latching counter-element 19 in the form of a hook. When the pressure-transmission element 9 is deflected, the latching element 18 disengages from the latching counter-element 19 when the target pressure is exceeded. This is irreversible, so that the latching element 18 and the latching counter-element 19 remain disengaged even if the pressure subsequently drops below the target pressure. This makes it easy to see whether the container 1 has been subjected to sufficient pressure treatment.

The design of the container 1 as described above has the advantage that a reliable pressurisation of the inner space 4 can take place independently of the design of the vessel 2, namely through the deflection of the pressure-transmission element 9. The closure 3 is configured in such a way that the displacement of the pressure-transmission element 9 takes place without incurring damage and/or elastically. The described embodiment of the container 1 enables manufacture of the vessel 2 from glass, so that the vessel 2 is ultimately a glass vessel.

FIGS. 6a to 9c show a fifth embodiment of container 1 according to the invention. Container 1 (see FIG. 6b) comprises a vessel 2 and a closure 3, the closure 3 comprising a base body 8 and a pressure-transmission element 9. FIGS. 6a to 6d show views of the complete container 1 with vessel 2 and closure 3. FIGS. 7a to 7e show different views of vessel 2, FIGS. 8a to 8f show different views of base body 8 and FIGS. 9a to 9c show different views of pressure-transmission element 9. It should be understood that the invention relates both to the complete container 1 and to the individual components of this container 1, i.e. vessel 2 as well as base body 8 and pressure-transmission element 9. The fifth embodiment is similar to the preceding embodiments and in particular to the embodiment described with reference to FIG. 5. Therefore, reference can in principle be made to the foregoing explanations regarding the other embodiments and in particular to the explanations regarding the embodiment shown in FIG. 5.

As shown in the exploded view of FIG. 6b, the container 1 comprises the vessel 2, as well as the closure 3, whereby the closure 3 is formed by the base body 8, which can, for example, be rigid, and the pressure-transmission element 9. In the fifth embodiment, the base body 8 and the pressure-transmission element 9 are configured as separate elements. As can be seen in particular from FIGS. 9a to 9c, the pressure-transmission element 9 comprises a folding bellows 11 and a middle piece 12, the structure of which corresponds to the structure already described with reference to FIGS. 4 and 5. The pressure-transmission element 9 is rotationally symmetrical around an axis of rotation, which is also referred to as the longitudinal axis. The pressure-transmission element 9 comprises a connecting portion 90, which can also be referred to as a clamping portion 90. By means of this connecting portion 90, a connection can be made between the pressure-transmission element 9, the base body 8 and the vessel 2. In particular, the pressure-transmission element 9 can be connected by means of the connecting portion 90. In particular, this connecting portion 90 can be clamped between the vessel 2 and the base body 8, as can be seen for example in FIG. 6d. Therefore, the connecting portion 90 may also be referred to as the clamping portion 90. The connecting portion 90 is the portion of the pressure-transmission element 9 that is arranged radially furthest out. The connecting portion 90 in turn comprises an essentially planar portion 92 and an angled portion 94. In the embodiment shown, the (at least essentially) planar portion 92 is parallel to a plane that is orthogonal to the longitudinal axis, particularly in the condition in which the pressure-transmission element 9 is clamped between the vessel 2 and the base body 8 (see FIG. 6d). The longitudinal axis of the pressure-transmission element 9 can also be used to define the proximal and distal directions. Proximal should be the direction towards the inside of the vessel 2 and distal the opposite direction. It should therefore be understood that the middle piece 12 is the most proximal element of the pressure-transmission element 9. The angled portion 94 comprises an angle with the planar portion 92 and extends from the planar portion 92 (at that angle) in a proximal direction. In particular, this means that in some embodiments the planar portion 92 may be the most distal element of the pressure-transmission element 9. However, it should be noted that this is not necessary and that there may be embodiments in which other elements are provided in the pressure-transmission element 9 that are more distal than the planar portion 92; see, for example, FIG. 5, in which, for example, the latching element 18 is arranged more distally.

As can be seen in FIG. 6d, for example, the pressure-transmission element 9 can be clamped between the vessel 2 and the base body 8 by means of the connecting portion 90 and in particular by means of the planar portion 92 of the connecting portion 90. The angled portion 94 can abut against a stop element 84 of the base body 8. This can create a secure and reliable seal.

In particular, the angled portion 94 may be positioned radially further outward than a distal end portion 28 when connected to the vessel 2.

The angled portion 94 may also serve to centre the pressure-transmission element 9 on the vessel 2. This may be advantageous as otherwise there is a risk that the pressure-transmission element 9 may slide off when the closure is closed and subsequently have no sealing effect.

As can be seen in particular in FIG. 9c, radially inwards of the planar portion 92, a transition portion 96 is adjacent, which is arranged between the planar portion 92 and the folding bellows 11. In the embodiment shown, this transition portion 96 is arranged radially further outwards than the radially outermost portions of the folding bellows 11. The provision of such a transition portion 96 represents a difference to the embodiment shown in FIG. 5, in which a planar portion extends virtually to the radially innermost extension of the folding bellows 11.

In the radial direction, the planar portion 92 can, for example, have an extension (see FIG. 9 C, R) of 2 to 8 mm, preferably 3 to 5 mm, for example approx. 4 millimetres. Such a configuration has proven to be particularly suitable for providing a secure seal and at the same time giving the pressure-transmission element 9 sufficient flexibility to be able to reliably introduce high pressures into the vessel 2.

FIGS. 8a to 8g show the base body 8. The base body 8 may also be referred to as the closure body 8, the base element 8 or generally simply as the body 8. Apart from some elements, the base body 8 also has rotational symmetry. Therefore, the base body 8 can be described as essentially rotationally symmetrical. Therefore, a symmetry axis can also be defined for the base body 8, which can also be described as a longitudinal axis. In the assembled state (see e.g. FIGS. 6a to 6d), this longitudinal axis coincides with the longitudinal axis of the pressure-transmission element 9. The closure base body 8 (see for example FIGS. 8b and 8g) comprises an internal thread 82. Preferably this internal thread 82 runs around the longitudinal axis approximately once—see for example FIG. 8b. In particular, the internal thread 82 can run around the longitudinal axis by more than 250°, preferably by more than 300°, more preferably by more than 350°, but by no more than 450°, preferably no more than 430°, more preferably no more than 400°. The directions proximal and distal can also be defined for the base body 8. Once again, these directions are defined along the longitudinal axis and once again proximal is the direction which, in intended use, is located closer to the interior of the vessel 2 than the distal direction. In this context, see also FIG. 8g in which these directions are defined. In particular, the internal thread 82 can increase the thickness of a wall of the base body 8, as shown in FIG. 8g (also FIG. 4, different FIG. 5).

As already described, the base body 8 may also have an internal stop element 84. In particular, this stop element 84 can extend completely around the longitudinal axis of the base body 8. Thus, this stop element 84 may be configured as an annular element. It should be understood that this stop element 84 is rotationally symmetrical with respect to the longitudinal axis. As already described with regard to FIG. 6d, the angled portion 94 of the connecting portion 90 of the pressure-transmission element 9 can abut against this stop element 84 in the intended use. In this way, a defined position of the pressure-transmission element 9 in the base body 8 can be achieved in the intended use. As can be seen in FIG. 8g, for example, the stop element 84 is arranged further distally than the internal thread 82. The stop element 84 can have a smaller extension in the radial direction than the internal thread 82.

The base body 8 can furthermore comprise a lid surface 86—see, for example, FIGS. 8a and 8b. A recess 88 can be arranged in this lid surface 86. Hereby, in the assembled state of vessel 2, base body 8 and pressure-transmission element 9—see, for example, FIGS. 6a and 6d—a pressure can be transferred outside the container 1 to the outer side of the pressure-transmission element 9 and by means of the pressure-transmission element 9 to the inside of the vessel 2. The lid surface 86 is also referred to as the cover.

The base body 8, which may also be referred to as a closure ring 8, may furthermore comprise a contact edge 87 on an inner side of the lid surface 86 (see in particular FIGS. 8g and 6d). This contact edge 87 can again be annular and protrude over a base surface of the inner side of the lid surface 86.

After closing (see FIG. 6d), this edge 87 can fix the pressure-transmission element 9. This allows the pressure-transmission element 9 to be securely fixed so that the pressure-transmission element 9 does not lose its seat during pressurisation. The edge 87 can press the pressure-transmission element 9 together at the edge of the vessel 2 so that the sealing effect is increased. In particular, the contact edge 87 may be configured to be arranged radially in the area defined by the distal end 28, which may be configured as an annular surface.

As can be seen in, for example, FIG. 8g, the stop element 84 may be arranged further distally than the internal thread 82. The base body 8 also has a radially outer sheath element 81—see, for example, FIGS. 8a, 8b and 8g. FIG. 8c also shows this sheath element, which may also be referred to as radial outer surface 81. The sheath element 81 may also be referred to as the radial area 81 and represents the portion of the body 8 that extends along the longitudinal axis. In a distal portion, the radial outer surface 81 may have a structuring 810, for example in the form of rod-shaped elements running parallel to the longitudinal axis. By means of this structuring 810, the handling and in particular the opening and closing of the container 1 can be facilitated for a user. The distal portion 810 structured in this way can have an axial length in the range from 4 mm to 15 mm, preferably in the range from 6 mm to 10 mm, more preferably in the range from 7 mm to 9 mm, for example 8 mm.

Furthermore, the radial outer surface 81, which may also be described as the radial outer area 81, comprises a proximal portion 820. This proximal portion 820 may have a length in the axial direction of 2 mm to 10 mm, preferably 3 mm to 7 mm, more preferably 4 mm to 6 mm, for example 5 mm. The proximal portion 820 may in particular comprise at least one tamper-evident element 822—see in this regard, for example, FIGS. 8a, 8b, 8c, 8d, 8e and 8 g. In the embodiment discussed here, the proximal portion 820 has two tamper-evident-elements 822 arranged opposite each other, i.e. displaced by 180°, on the proximal portion 820 of the radial outer surface 81, which may also be referred to as the radial outer area 81. In a view along the longitudinal axis (see FIG. 8e), the tamper-evident elements 822 are each wedge-shaped. Preferably, the tamper-evident elements 822 in this view have an undercut 823. No material is provided directly axially or directly distally of the tamper-evident elements 822. In FIG. 8d and also in FIG. 8g on the left, it can be seen that free spaces 824 are provided directly distal and directly proximal to the tamper-evident-element 822. It is, however, also possible—see FIGS. 8a and 8b, in each case the front tamper-evident-element 822—that the tamper-evident-element 822 is located at the proximal end of the radial outer surface 81, so that only one clearance is provided, since there is no material proximal to the tamper-evident-element 822 anyway. The tamper-evident-element 822 may also have a predetermined breaking area 826, see for example FIG. 8d. In the embodiment shown here, the predetermined breaking area 826 is provided in the form of two thin legs (in the axial direction), which are separated by a free space.

As already described, in some embodiments a plurality (for example two) of tamper-evident elements 822 can be provided, which are arranged, for example, opposite each other—see here, for example, FIG. 8b. In such embodiments (see also FIG. 8b), it may be preferred that the tamper-evident elements 822 are arranged in different positions with respect to the direction defined by the longitudinal axis. For example, in FIG. 8b, the front tamper-evident element 822 in this figure is located at the proximal end of the proximal portion 820, while the opposite tamper-evident element 822 is not located at the proximal end of the proximal portion 820. Instead, this tamper-evident element 822, which is located at the rear in FIG. 8b, has a portion of material located proximally of this tamper-evident element 822. In simple words, the tamper-evident-elements 822 are arranged at different heights. Generally, it is possible that the tamper-evident-elements 822 are provided further proximal than the internal thread 82.

An axial longitudinal axis can also be defined for the vessel 2 (see FIGS. 7a to 7c), which coincides with the longitudinal axis of the pressure-transmission element 9 in the connected state. In the same way as described above, the distal and proximal directions can be defined along this longitudinal axis—see FIG. 7d. In this case, the distal direction is the direction pointing towards the pressure-transmission element 9 or the base body 8 in the connected state and the proximal direction is the opposite direction—see FIG. 7d. Portion 22 of the vessel 2 is configured as connecting portion 22 and is configured in particular for connection with the base body 8 (and optionally with the pressure-transmission element 9). The connecting portion 22 comprises in particular a thread 24. This external thread 24 can be connected to the internal thread 82 of the base body 8. Furthermore, the connecting portion 22 comprises at least one counter element 26. The at least one counter element 26 is arranged proximal to the external thread 24. In particular, the counter element 26 can interact with the tamper-evident element 822 in such a way that the base body 8 can be screwed onto the connecting portion 22 of the vessel 2 without damaging the predetermined breaking point 826 of the tamper-evident element 822, but this predetermined breaking point 826 is damaged when the base body 8 and the connecting portion 22 are screwed apart. In particular, the counter element 26 can be configured as a ramp element whose height in radial direction, i.e. distance from the longitudinal axis, steadily increases in one direction and then suddenly decreases. This makes it possible for the base body 8 to be screwed onto the vessel 2 without damaging the tamper-evident element 822, but that these elements can be separated from each other only by damaging the tamper-evident element 822.

In the embodiment shown in FIGS. 7a to 7e, two counter-elements 26 are provided which are arranged opposite each other, i.e. displaced by 180°. Such a provision of a plurality of tamper-evident elements 822 on the base body 8, for example of two tamper-evident elements 822, and of a plurality of counter elements 26, for example of two counter-elements 26 in front, is advantageous in order to be able to reliably guarantee the originality of the closure. This may be particularly relevant when the vessel 2 is made of glass, as the manufacturing tolerances of glass are such that the provision of only one tamper-evident-element 822 and only one counter-element 26 may not be sufficient in some cases.

In particular, as can be seen in FIGS. 7d and 6d, a distal end 28 of the connecting portion 22 may be configured as a planar surface whose plane is perpendicular to the longitudinal axis of the vessel 2. In this way, for example, a suitable sealing of the pressure-transmission element 9 can be achieved.

The fifth embodiment described with reference to FIGS. 6a to 9c may in particular also be used in a method described with reference to FIG. 10. In a first step S1, a substance, for example a liquid such as a juice, can first be filled into the vessel. Then, in a second step S2, the pressure-transmission element 9 can be attached to the vessel 2. In particular, (see FIG. 6d) the planar portion 92 may be placed on the distal end 28 of the vessel 2. Then, in a further step S3, the base body 8 can be attached to the vessel and at the same time the pressure-transmission element 9 can be clamped between the base body 8 and the vessel 2. This can be done in particular by screwing the base body 8 onto the vessel 2. This results in a connection between the internal thread 82 of the base body 8 and the external thread 24 of the connecting portion 22 of the vessel 2. The angled portion 94 of the connecting portion 90 of the pressure-transmission element 9 abuts against the stop element 84. Furthermore, the tamper-evident elements 822 are guided over the counter elements 26 of the connecting portion 22 of the vessel 2 without the tamper-evident element 822 incurring any damage. At the end of this step S3, the container 1 is in the closed configuration shown in FIGS. 6a, 6b and 6d. Subsequently, in a step S4, a pressure can be transferred from the exterior of the container 1 to the interior of the container 1 via the pressure-transmission element 9. For example, the container 1 can be placed in a pressure chamber that is at a pressure that is significantly higher than atmospheric pressure. This pressure is transferred to the inside of the container 1 via the pressure-transmission element 9, whereby such a pressure transfer to the inside of the container 1 can also take place, particularly in the case of rigid glass containers, so that such a glass container can also be sterilised by means of high pressure.

The invention claimed is:

1. Closure for fluid-tight closing of a vessel filled with a substance, the closure comprising a fluid-tight pressure-transmission element and the closure comprising a base body to which the pressure-transmission element can be attached in a fluid-tight manner, wherein the pressure-transmission element is deflectable by pressurisation without incurring damage, for biological inactivation of microorganisms present in the substance, wherein the closure is configured in such a way that the pressure-transmission element, when the vessel is closed with the closure, is held clamped between the vessel and the base body;

wherein the base body comprises a plurality of tamper-evident elements, wherein the base body is configured to be attached to the vessel without damage to the plurality of tamper-evident elements and to be separated from the vessel with damage to at least one of the plurality of tamper-evident elements;

wherein the base body has a longitudinal body axis along which the directions proximal and distal are defined, wherein proximal, in the intended use, points towards an interior of the vessel and distal opposite thereto, wherein at least two of the plurality of tamper-evident elements are arranged at different positions along said longitudinal body axis.

2. Closure according to claim 1, wherein the plurality of tamper-evident elements comprises two tamper-evident elements arranged 180° displaced from each other each other with respect to the longitudinal body axis.

3. Closure according to claim 1, wherein the base body is formed in a materially uniform manner, wherein each tamper-evident-element comprises a wedge structure, wherein each tamper-evident-element comprises a predetermined breaking area and wherein no material of the base body is provided directly proximal and directly distal to each tamper-evident element.

4. Closure according to of claim 1, wherein the base body comprises a sheath element and a lid surface, said sheath element comprising a distal portion and an adjoining proximal portion, said proximal portion having a length along said longitudinal body axis of from 2 mm to 10 mm, wherein said at least one tamper-evident-element is provided in the proximal portion.

5. Closure according to claim 1, wherein the pressure-transmission element comprises a connecting portion, wherein the connecting portion is configured to be clamped between the base body and the vessel, wherein the connecting portion comprises a planar portion that is parallel to a plane perpendicular to a longitudinal axis.

6. Closure according to claim 5, wherein the planar portion has an extension in the radial direction of from 2 mm to 8 mm and wherein the connecting portion comprises an angled portion arranged at an angle to the planar portion, wherein the angled portion is arranged radially further outward than the planar portion, wherein the base body comprises a stop element, wherein the angled portion abuts the stop member.

7. Closure according to claim 5, wherein the pressure-transmission element comprises a folding bellows, wherein the pressure-transmission element comprises a transition portion arranged between the planar portion and the folding bellows, and wherein the transition portion is arranged radially further outward than the radially outermost portion of the folding bellows.

8. Closure according to claim 7, wherein the pressure-transmission element has an extension perpendicular to the longitudinal axis which is in the range of 20 mm to 60 mm.

9. Container with a vessel and with a closure which closes the vessel in a fluid-tight manner according to claim 1, wherein the pressure-transmission element is held clamped between the vessel and the base body.

10. Container according to claim 9, wherein said closure comprises the features of claim 2, wherein said vessel comprises a connecting portion configured to be connected to the closure, wherein the connecting portion comprises at least one counter-element configured to interact with said at least one tamper-evident element.

11. Container according to claim 10, wherein the vessel has a longitudinal vessel axis along which the directions proximal and distal are defined, wherein distal, in the intended use, points in the direction of the base body and proximal is opposite thereto, wherein the at least one counter element is a plurality of counter elements, wherein the counter elements comprise two counter elements which are arranged 180° displaced from each other with respect to the longitudinal vessel axis and wherein each of the at least one counter element is configured as a ramp element and wherein each of the counter elements is arranged at the same position along the longitudinal vessel axis.

12. Closure according to claim 1, wherein the at least two of the plurality of tamper-evident elements are arranged at different heights.

13. Method for filling a container with a substance, wherein the container is a container according to claim 9, wherein after introduction of the substance into the vessel and after closure of the vessel by means of the closure, the pressure-transmission element is deflected by pressurisation without incurring damage, for biological inactivation of microorganisms present in the substance.

14. Method according to claim 13,
wherein closing the vessel by means of the closure comprises the following steps:
attaching the pressure-transmission element to the vessel, and
attaching the base body to the vessel,
wherein the step of attaching the base body to the vessel is performed after the step of attaching the pressure-transmission element to the vessel.

15. Method according to claim 13,
wherein the method further comprises
clamping the pressure-transmission element between the vessel and the base body.

* * * * *